United States Patent
Yamamoto et al.

(10) Patent No.: US 12,533,748 B2
(45) Date of Patent: Jan. 27, 2026

(54) LASER WELDING DEVICE AND LASER WELDING METHOD

(71) Applicant: DELTA KOGYO CO., LTD., Hiroshima (JP)

(72) Inventors: Yukio Yamamoto, Hiroshima (JP); Tomohito Tsudo, Hiroshima (JP); Seiya Takahashi, Hiroshima (JP); Chieko Hashizaka, Hiroshima (JP)

(73) Assignee: DELTA KOGYO CO., LTD., Hiroshima (JP)

( * ) Notice: Subject to any disclaimer, the term of this patent is extended or adjusted under 35 U.S.C. 154(b) by 995 days.

(21) Appl. No.: 17/437,820

(22) PCT Filed: Mar. 10, 2020

(86) PCT No.: PCT/JP2020/010402
§ 371 (c)(1),
(2) Date: Sep. 9, 2021

(87) PCT Pub. No.: WO2020/195806
PCT Pub. Date: Oct. 1, 2020

(65) Prior Publication Data
US 2022/0152736 A1    May 19, 2022

(30) Foreign Application Priority Data
Mar. 28, 2019  (JP) .................. 2019-064957

(51) Int. Cl.
*B23K 26/073*  (2006.01)
*B23K 26/082*  (2014.01)
(Continued)

(52) U.S. Cl.
CPC .......... *B23K 26/073* (2013.01); *B23K 26/082* (2015.10); *B23K 26/22* (2013.01);
(Continued)

(58) Field of Classification Search
CPC .... B23K 26/073; B23K 26/082; B23K 26/22; B23K 26/24; B23K 26/242; B23K 26/244
See application file for complete search history.

(56) References Cited

U.S. PATENT DOCUMENTS 10,118,249 B2 *  11/2018  Solomon ................. B23K 26/04
11,225,990 B2 *   1/2022  Miyashiro ............ B23K 26/244
(Continued)

FOREIGN PATENT DOCUMENTS

CN       104023900 A     9/2014
CN       104507628 A     4/2015
(Continued)

OTHER PUBLICATIONS

Machine English translation of JP-2008161911-A (Year: 2008).*
(Continued)

*Primary Examiner* — Steven W Crabb
*Assistant Examiner* — Fahmida Ferdousi
(74) *Attorney, Agent, or Firm* — Studebaker Brackett PLLC

(57) ABSTRACT

A laser welding method includes a laser beam irradiation step of oscillating a laser beam and condensing the laser beam on a welding portion, and a scanning step of scanning a spot of the laser beam. In the execution of laser welding, while oscillating the laser beam, a screw portion having a dot shape in a plan view is formed in which a metal member is melted by scanning of the spot so as to circle around a predetermined position, and while the metal member in the screw portion is in a molten state, a linear portion being linear in a plan view and continuous with the screw portion is formed in which a metal member is melted by scanning of the spot so as to be separated from the screw portion.

4 Claims, 23 Drawing Sheets

(51) Int. Cl.
  *B23K 26/22* (2006.01)
  *B23K 26/24* (2014.01)
  *B23K 26/242* (2014.01)
  *B23K 26/244* (2014.01)

(52) U.S. Cl.
  CPC ............ *B23K 26/24* (2013.01); *B23K 26/242* (2015.10); *B23K 26/244* (2015.10)

(56) References Cited

U.S. PATENT DOCUMENTS

| | | |
|---|---|---|
| 2004/0182836 A1 | 9/2004 | Becker et al. |
| 2014/0377578 A1 | 12/2014 | Hisada et al. |
| 2015/0174702 A1* | 6/2015 | Fujimoto ............... B23K 26/32 219/121.64 |
| 2016/0271730 A1 | 9/2016 | Gu et al. |
| 2017/0001260 A1 | 1/2017 | Gu et al. |
| 2017/0008124 A1 | 1/2017 | Fujimoto et al. |
| 2017/0050269 A1 | 2/2017 | Nakagawa et al. |
| 2017/0106470 A1 | 4/2017 | Solomon et al. |
| 2018/0079031 A1 | 3/2018 | Takebe et al. |
| 2018/0117707 A1 | 5/2018 | Fujiwara et al. |
| 2018/0304405 A1 | 10/2018 | Yang et al. |
| 2019/0061056 A1* | 2/2019 | Yang .................... B23K 26/322 |
| 2020/0122271 A1* | 4/2020 | Kobayashi ......... B23K 26/0892 |

FOREIGN PATENT DOCUMENTS

| | | | |
|---|---|---|---|
| CN | 107427962 A | | 12/2017 |
| CN | 108367391 A | | 8/2018 |
| EP | 3112076 A1 | | 1/2017 |
| IN | 107107268 A | | 8/2017 |
| JP | 2008161911 A | * | 7/2008 |
| JP | 5131810 B2 | | 1/2013 |
| JP | 2013189173 A | * | 9/2013 |
| JP | 2018-108602 A | | 7/2018 |
| WO | 2015/129231 A1 | | 9/2015 |
| WO | 2016/189855 A1 | | 12/2016 |

OTHER PUBLICATIONS https://www.azooptics.com/Article.aspx?ArticleID=661 (Year: 2014).*
Machine English translation of JP-2013189173-A (Year: 2013).*
An Office Action mailed by China National Intellectual Property Administration on Nov. 25, 2022, which corresponds to Chinese Patent Application No. 202080019946.6 and is related to U.S. Appl. No. 17/437,820; with an English summary.
The extended European search report issued by the European Patent Office on Apr. 8, 2022, which corresponds to European Patent Application No. 20777947.1-1103 and is related to U.S. Appl. No. 17/437,820.
International Search Report issued in : PCT/JP2020/010402; mailed May 19, 2020.

* cited by examiner

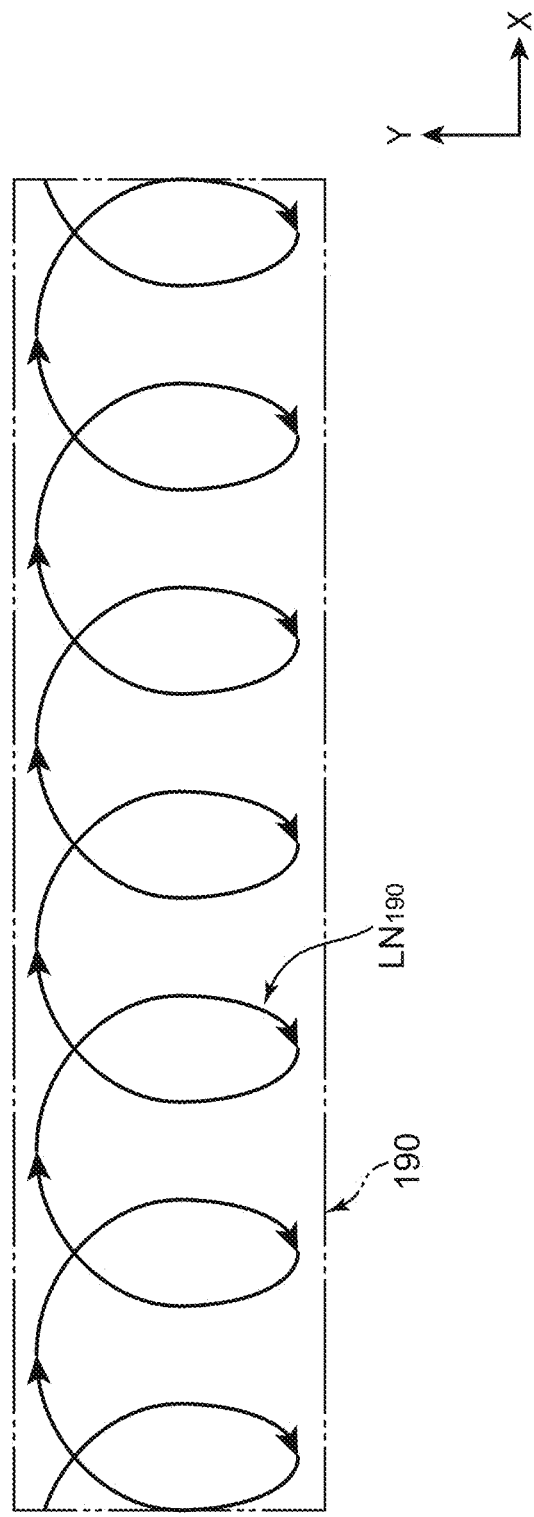

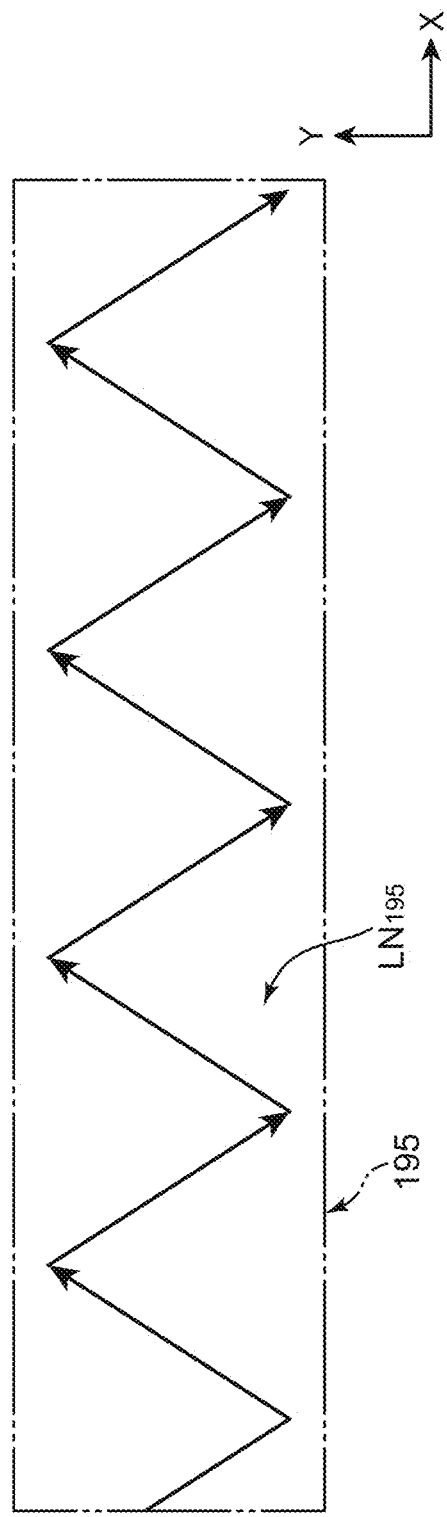

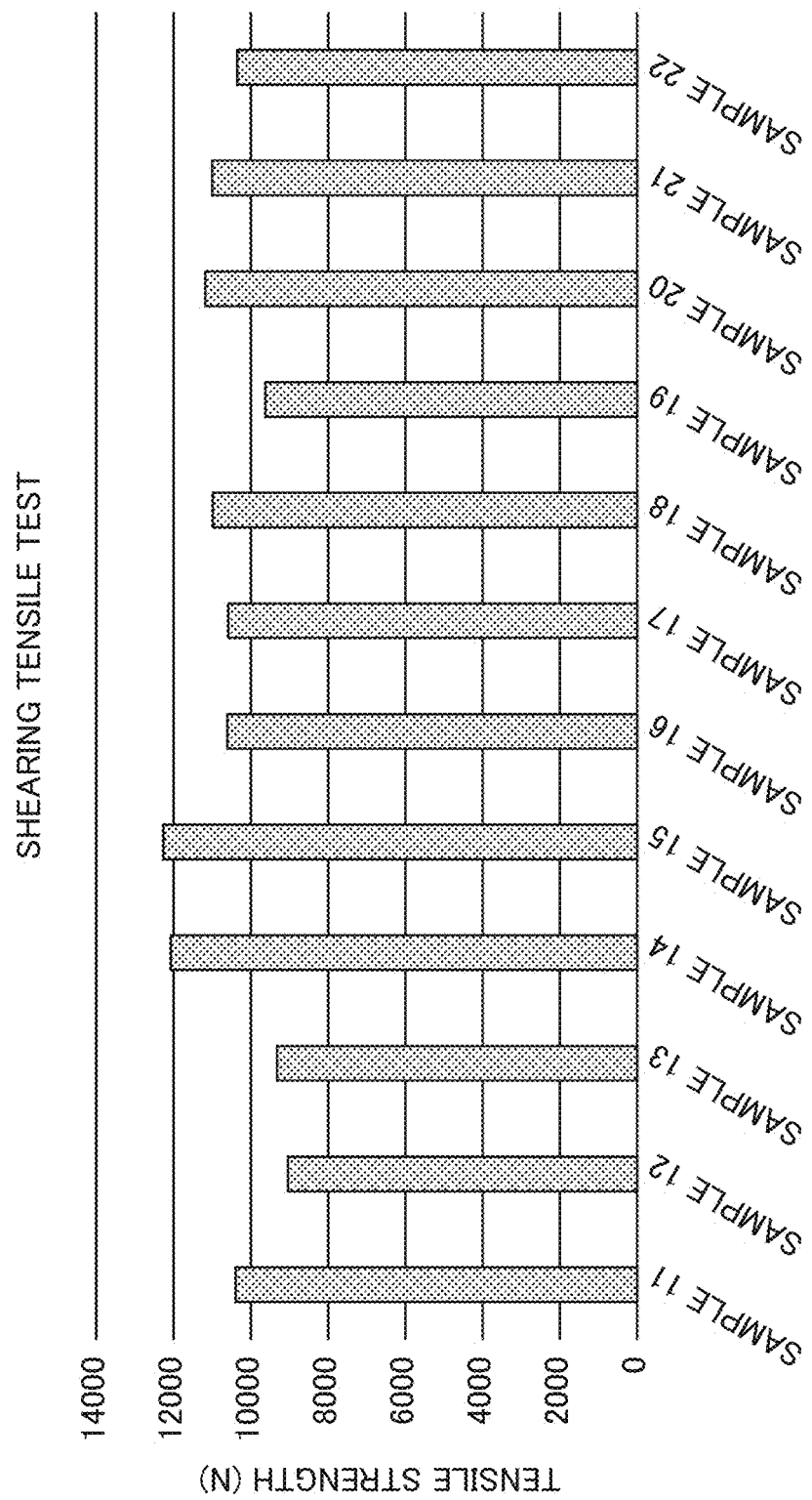

LASER WELDING DEVICE AND LASER WELDING METHOD

TECHNICAL FIELD

The present invention relates to a laser welding device and a laser welding method.

BACKGROUND ART

A laser welding technology may be used for joining metal members. Joining of metal members using laser welding is performed by melting and solidifying a part of the metal members by irradiation with a laser beam. Joining of metal members using laser welding has advantages of having a faster welding speed and being less affected by heat over joining of metal members by resistance welding. In a case of joining metal members by laser welding, welding of the metal members can be performed in a non-contact manner, resulting in having high processing efficiency and enabling rigidity to be increased by continuous welding.

For example, Patent Literature 1 discloses a technology using laser welding in the manufacture of a crash box. In the technology disclosed in Patent Literature 1, a flange of a first member bent so as to have a hat-shaped cross section is irradiated with a laser beam, thereby joining a plate-like second member overlapped at the flange. Here, in the laser welding disclosed in Patent Literature 1, in a plan view of the flange, first welding portions separated from each other and each having a substantially circular shape in a plan view are formed, and then a linear second welding portion is formed which connects the first welding portions adjacent to each other. As described above, by forming the linear second welding portion between the first welding portions, the crash box disclosed in Patent Literature 1 is assumed to enable a region between the first welding portions to be reliably used as a starting point of buckling, and enable stable buckling deformation to be generated when a high impact force is applied to the crash box.

CITATION LIST

Patent Literature

Patent Literature 1: Japanese Patent No. 5131810

SUMMARY OF INVENTION

However, in the technology disclosed in Patent Literature 1, in a case where a gap is present between the first member and the second member in a part (flange) for the joining, good joining strength cannot be ensured. This is because according to the technique disclosed in Patent Literature 1 described above, in a case where a gap is present between the first member and the second member, since the second welding portion is formed after the first welding portion is formed, sufficient molten metal that can fill the gap between the members is not supplied to the second welding portion, resulting in making it difficult to reliably join the members in the second welding portion. Therefore, from a viewpoint of joining the metal members with higher joining strength, there is a room for improvement in the technology disclosed in Patent Literature 1.

The present invention has been made to solve the above problems, and an object thereof is to provide a laser welding device and a laser welding method which enable metal members to be joined with higher joining strength even when a gap is present between the members.

A laser welding device according to one aspect of the present invention is a laser welding device that joins a plurality of metal members by laser welding, the laser welding device including: a laser oscillator that oscillates a laser beam; a light condensing unit that condenses the laser beam on a welding position; a scanning unit that scans a spot of the laser beam; and a control unit that controls the laser oscillator and the scanning unit, in which while causing the laser oscillator to oscillate the laser beam, the control unit forms a screw portion which has a dot shape in a plan view and in which a metal member is melted by scanning of the spot of the laser beam so as to circle around a predetermined position, and while the metal member in the screw portion is in a molten state, the control unit forms a linear portion which is linear in a plan view and continuous with the screw portion and in which a metal member is melted by scanning of the spot of the laser beam so as to be separated from the screw portion.

BRIEF DESCRIPTION OF DRAWINGS

FIG. 12A is a schematic view illustrating a welding mode according to a sixteenth embodiment.

FIG. 12B is a schematic view illustrating a welding mode according to a seventeenth embodiment.

FIG. 19 is a graph showing results of the shearing tensile test.

DESCRIPTION OF EMBODIMENTS

Hereinafter, embodiments will be described with reference to the drawings. An embodiment to be described below is an example of the present invention, and the present invention is not limited to the following embodiment except for its essential configuration.

First Embodiment

1. Schematic Configuration of Laser Welding Device 1

Figure 1:
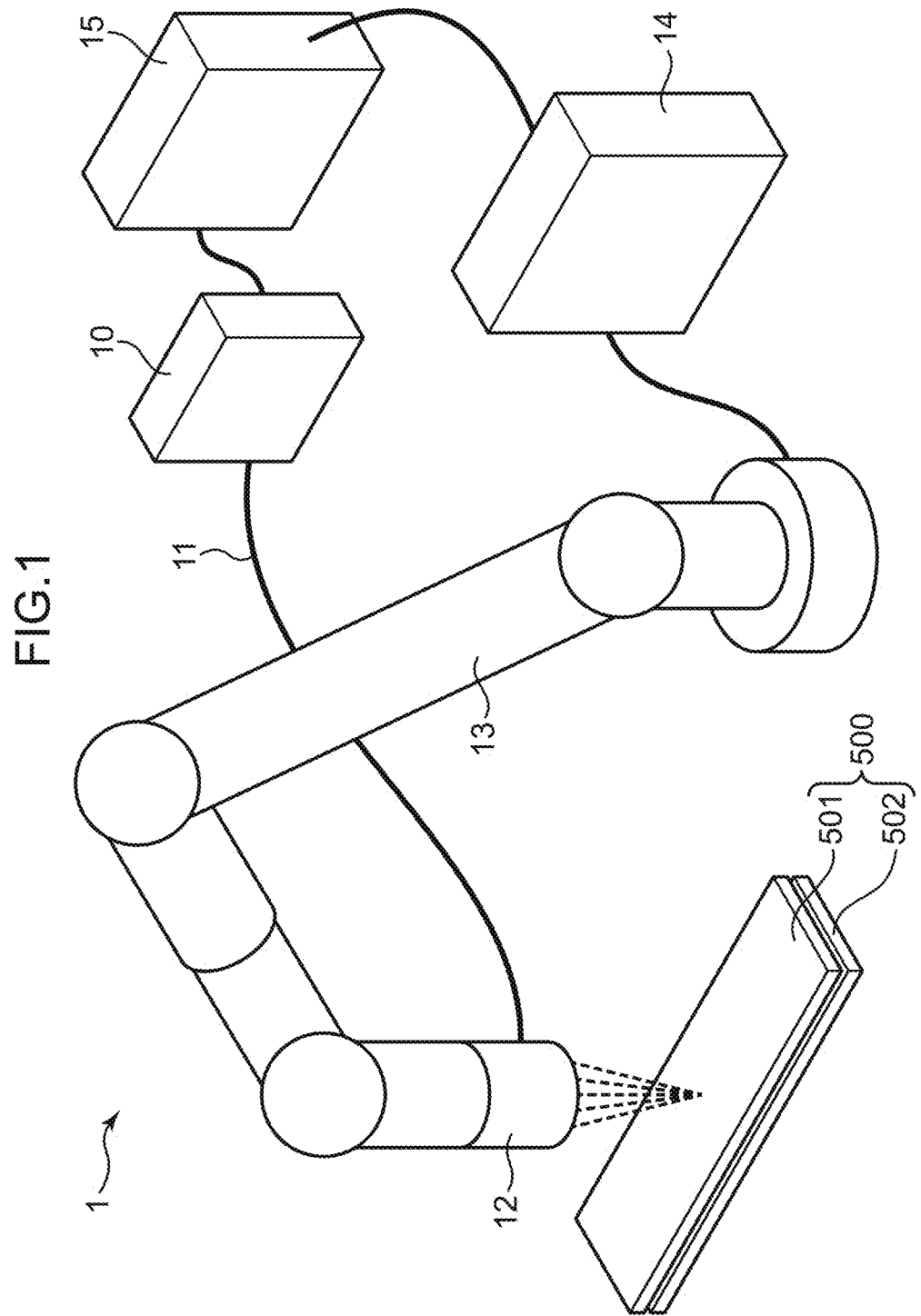
FIG. 1 is a schematic view illustrating a schematic configuration of a laser welding device according to a first embodiment.

A schematic configuration of a laser welding device 1 according to a first embodiment will be described with reference to FIG. 1. FIG. 1 is a schematic view illustrating a schematic configuration of the laser welding device 1 according to the present embodiment.

As illustrated in FIG. 1, the laser welding device 1 according to the present embodiment includes a laser oscillator 10, an optical path 11, and a light condensing unit 12. The laser oscillator 10 oscillates a laser beam in accordance with a command from a controller (control unit) 15 connected to the laser oscillator 10. The controller 15 is configured to include a microprocessor including a CPU, a ROM, a RAM, and the like.

The laser beam oscillated by the laser oscillator 10 is propagated to the light condensing unit 12 through the optical path 11. By the light condensing unit 12, the propagated laser beam is condensed on a surface of a plate member (metal member) 501 in a plate member laminate 500 (a spot is formed). Here, the light condensing unit 12 is a scanning unit and scans a spot of the laser beam on the surface of the plate member 501 in response to a command from the controller 15.

In the present embodiment, although an optical fiber cable is used as an example of the optical path 11, various optical paths capable of propagating a laser beam can be adopted in addition thereto. Here, in the present embodiment, the plate member laminate 500 as an object to be welded is a laminate of the plate member (metal member) 501 and a plate member (metal member) 502.

The laser welding device 1 includes a welding robot 13 and a drive circuit unit 14 that drives the welding robot 13. The welding robot 13 has the light condensing unit 12 attached to a front end portion thereof, and is capable of moving the light condensing unit 12 three-dimensionally in accordance with a command from the controller 15 connected to the drive circuit unit 14.

2. Schematic Configuration of Plate Member Laminate 500

Figure 2:
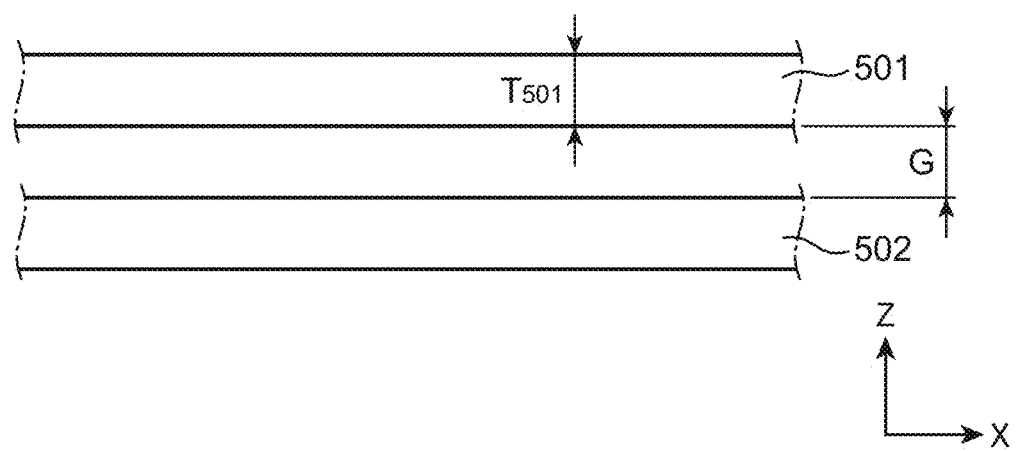
FIG. 2 is a schematic side view illustrating how plate members are disposed before welding.

A schematic configuration of the plate member laminate 500 will be described with reference to FIG. 2. FIG. 2 is a schematic side view illustrating how the plate members 501 and 502 configuring the plate member laminate 500 are disposed before welding.

Although the plate member 501 and the plate member 502 are overlapped in a plate thickness direction, a gap G of, for example, about 1 mm at the maximum is present between the plate members before welding as illustrated in FIG. 2. Of the two plate members 501 and 502 configuring the plate member laminate 500, the plate member 501 disposed on a laser beam irradiation side has a plate thickness of $T_{501}$. The plate thickness $T_{501}$ is, for example, about 1 mm. The plate thickness $T_{501}$ can be set to about 0.5 mm to 3.2 mm. In other words, the configuration according to the present embodiment can be suitably applied to a so-called thin plate.

3. Welding Mode Using Laser Welding Device 1

Figure 3:
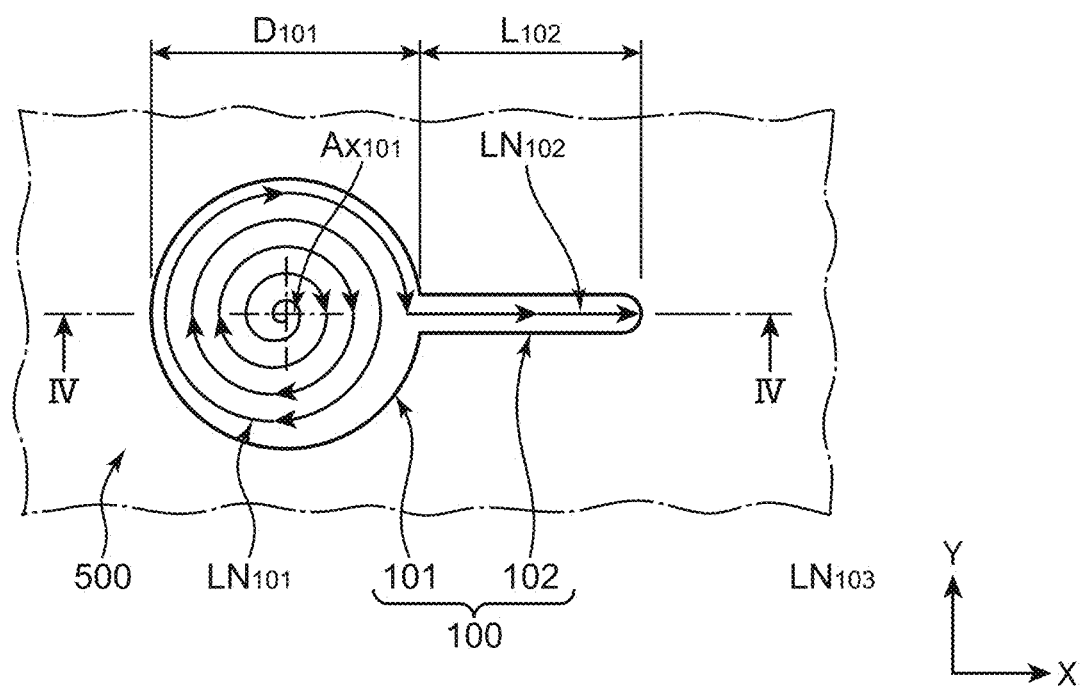
FIG. 3 is a schematic plan view illustrating a welding mode using the laser welding device according to the first embodiment.

A welding mode using the laser welding device 1 according to the present embodiment will be described with reference to FIG. 3 and FIG. 4. FIG. 3 is a schematic plan view illustrating a welding mode using the laser welding device 1, and FIG. 4 is a schematic cross-sectional view illustrating a cross section taken along line IV-IV in FIG. 3.

As illustrated in FIG. 3, in the welding using the laser welding device 1 according to the present embodiment, while issuing a command to the laser oscillator 10 to oscillate the laser beam (a laser beam irradiation step execution command), the controller 15 issues a command to the light condensing unit 12 so that a spot of the laser beam sequentially passes on laser beam scanning loci $LN_{101}$ and $LN_{102}$ (a scanning step is executed). Specifically, the controller 15 first controls the light condensing unit 12 so that a spot of the laser beam passes on the laser beam scanning locus $LN_{101}$ circling around a predetermined position (circling center) $Ax_{101}$ of the plate member laminate 500. As a result, metal in a screw portion 101, which is a region having a substantially circular shape in a plan view and including the circling center $Ax_{101}$, is incited and stirred. In other words, the screw portion 101 having a substantially circular shape in a plan view in which metal is melted and stirred is formed.

Next, the controller 15 controls the light condensing unit 12 so that the spot of the laser beam continuously passes on the laser beam scanning locus $LN_{102}$ before the molten metal of the screw portion 101 is solidified (while the molten state is maintained), the laser beam scanning locus extending from an outer edge portion of the screw portion 101 so as to be extending away to the right side in an X direction. As a result, the metal in a linear portion 102, which is a plan view linear region, melts around the laser beam scanning locus $LN_{102}$. In other words, the linear portion 102 is formed which is linear in a plan view and in which metal is melted. At this time, as shown in FIG. 4, a part of the molten metal stirred in the screw portion 101 flows into the gap G between the plate member 501 and the plate member 502 in the linear portion 102, so that the plate members are firmly joined in the linear portion 102 even if the gap G is present.

Figure 4:
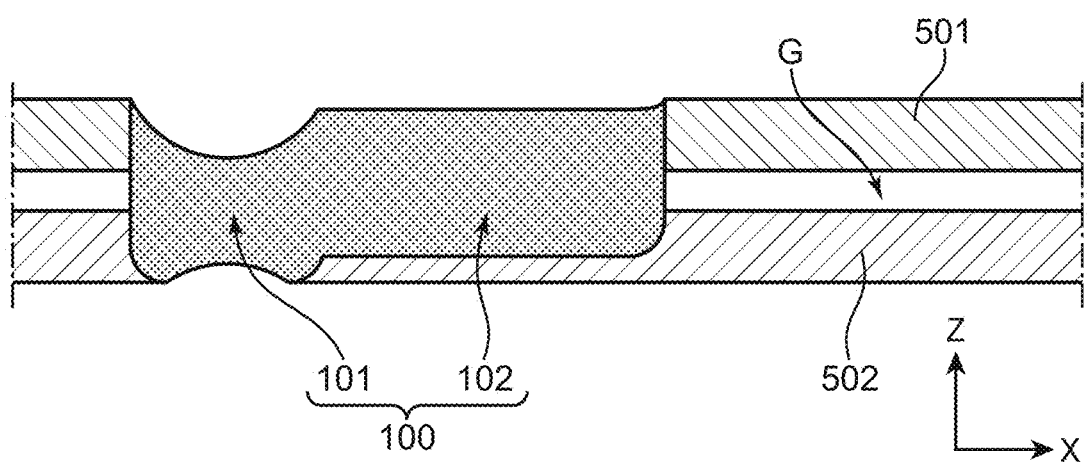
FIG. 4 is a schematic cross-sectional view illustrating a cross section taken along line IV-IV in FIG. 3.

As shown in FIG. 4, in the screw portion 101 formed at a stage before the formation of the linear portion 102, a recessed portion may also be formed on a lower face of the plate member 502 in a Z direction. This is because laser welding to the linear portion 102 is started while the metal of the screw portion 101 is in a molten state, and a part of the molten metal of the screw portion 101 flows into the gap G.

Then, as illustrated in FIG. 3 and FIG. 4, the molten metal is solidified to form a welding portion (nugget) 100 including the screw portion 101 and the linear portion 102 continuous with each other.

The screw portion 101 has a diameter of $D_{101}$ and the linear portion 102 has a length in the X direction of $L_{102}$. Here, the extension length $L_{102}$ of the linear portion 102 in the X direction is set according to a plate thickness $T_{501}$ of the plate material 501, the gap G, the diameter $D_{101}$ of the screw portion 101, and the like. As an example, in the present embodiment, the plate thickness $T_{501}$ is 1 mm and the extension length $L_{102}$ of the linear portion 102 is about 5 mm.

4. Effects

As compared with a case of using resistance welding or the like, because the two plate members (metal members) 501 and 502 configuring the plate member laminate 500 are joined by laser welding, the laser welding device 1 according to the present embodiment and the laser welding method using the same have a higher welding speed and are less affected by heat, and enable the plate members 501 and 502 to be welded in a non-contact manner, resulting in having high processing efficiency and enabling rigidity to be increased by continuous welding.

Next, with the laser welding device 1 according to the present embodiment and the laser welding method using the same, the screw portion 101 is formed by causing the spot of the laser beam to circle, thereby melting and stirring metal of a relevant part, and while metal of the screw portion 101 is molten, the linear portion 102 is formed by scanning of the spot of the laser beam so as to be separated from the screw portion 101 in the X direction, thereby melting the metal of a relevant part. Therefore, even if the gap G is formed between the plate member 501 and the plate member 502 before welding, a part of the molten metal of the screw portion 101 will flow into the gap G of the linear portion 102. Therefore, in the welding method using the laser welding device 1 according to the present embodiment, even if the gap G is formed between the plate member 501 and the plate member 502 before welding, a gap between the metal members in the linear portion is filled with not only the molten metal of the linear portion but also molten metal added with the molten metal flowing from the screw portion, so that it is possible to suppress occurrence of gouging and burn-through.

Additionally, with the laser welding device 1 according to the present embodiment and the laser welding method using the same, when the metal member is melted at the time of forming the screw portion 101, the molten metal can be stirred well (while suppressing stagnation) at a part where the screw portion 101 is to be formed by causing the spot of the laser beam to circle in a substantially circular manner in a plan view (by scanning on the laser beam scanning locus $LN_{101}$). This makes it possible to promote favorable inflow of molten metal into the gap G between the plate material 501 and the plate material 502 in the linear portion 102.

In addition, with the laser welding device 1 according to the present embodiment and the laser welding method using the same, a part of the molten metal of the screw portion 101 can be attracted to the gap G between the plate members 501 and 502 in the linear portion 102 to fill the gap G in the linear portion 102. Therefore, even if the gap G is present between the plate members 501 and 502, high joining strength can be ensured.

As described above, with the laser welding device 1 according to the present embodiment and the laser welding method using the same, even in a case where the gap G is present between the plate member 501 and the plate member 502, the members can be joined to each other with high joining strength.

Second Embodiment

Figure 5A:
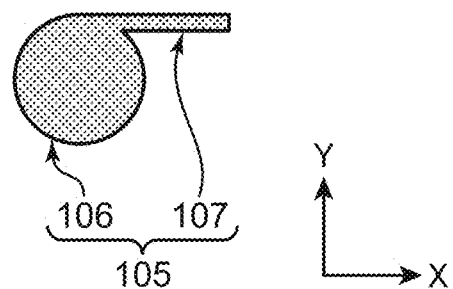
FIG. 5A is a schematic view illustrating a welding mode according to a second embodiment.

FIG. 5A is a schematic view illustrating a welding mode according to a second embodiment.

As illustrated in FIG. 5A, in a laser welding device according to the present embodiment, laser welding is performed to form a welding portion (nugget) 105 including a screw portion 106 having a substantially circular shape in a plan view and a linear portion 107 continuous with the screw portion 106 and extending linearly in a plan view.

In the screw portion 106, similarly to the screw portion 101 according to the first embodiment, a spot of a laser beam is caused to circle around a predetermined position, thereby causing metal of a relevant part to be melted and stirred. Then, the linear portion 107 is continuously irradiated with the laser beam before the metal of the screw portion 106 is solidified.

As illustrated in FIG. 5A, the linear portion 107 of the welding portion 105 according to the present embodiment has a different position of connection to the screw portion 106 from that of the first embodiment, the linear portion being connected to one end portion of the screw portion 106 in a radial direction so as to extend in a tangential direction.

Although in the laser welding device according to the present embodiment and the welding method using the same, the form of the welding portion 105 is different from that of the first embodiment, the same effects as those of the first embodiment can be obtained.

Third Embodiment

Figure 5B:
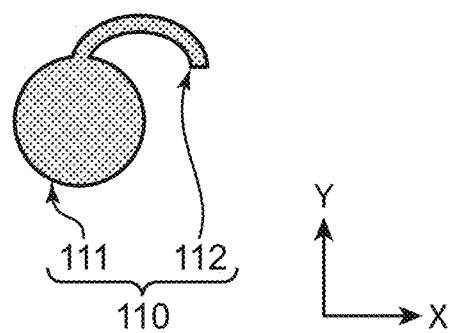
FIG. 5B is a schematic view illustrating a welding mode according to a third embodiment.

FIG. 5B is a schematic view illustrating a welding mode according to a third embodiment.

As illustrated in FIG. 5B, in a laser welding device according to the present embodiment, laser welding is performed to form a welding portion (nugget) 110 including a screw portion 111 having a substantially circular shape in a plan view and a linear portion 112 continuous with the screw portion 111 and extending linearly in a plan view.

In the screw portion 111, similarly to the screw portion 101 according to the first embodiment, a spot of a laser beam is caused to circle around a predetermined position, thereby causing metal of a relevant part to be melted and stirred. Then, the linear portion 112 is continuously irradiated with the laser beam before the metal of the screw portion 111 is solidified.

As shown in FIG. 5B, while being similar to the second embodiment in that the linear portion 112 is connected to one end portion of the screw portion 111 in the radial direction, the welding portion 110 according to the present embodiment is different from the second embodiment in that the linear portion 112 has a curved shape in a plan view (as an example, a substantially arc shape in a plan view in the present embodiment).

Although in the laser welding device according to the present embodiment and the welding method using the same, the form of the welding portion 110 is different from that of the second embodiment, the same effects as those of the second embodiment can be obtained. Further, in the present embodiment, since the linear portion 112 in the welding portion 110 is formed to have a substantially arc shape in a plan view, the locus of the spot of the laser beam in the linear portion 112 can be made long, so that higher joining strength can be ensured as compared with a case where the linear portion is formed to be linear in a plan view.

Fourth Embodiment

Figure 5C:
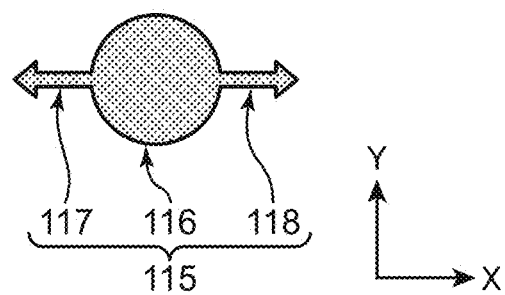
FIG. 5C is a schematic view illustrating a welding mode according to a fourth embodiment.

FIG. 5C is a schematic view illustrating a welding mode according to a fourth embodiment.

As illustrated in FIG. 5C, in a laser welding device according to the present embodiment, laser welding is performed to form a welding portion 115 including a screw portion 116 having a substantially circular shape in a plan view, a linear portion 117 being linear in a plan view and extending from the screw portion 116 toward one side in the radial direction of the screw portion 116 so as to be separated from the screw portion, and a linear portion 118 being linear in a plan view and extending from the screw portion 116 toward the other side in the radial direction. In the present embodiment, both the start of the laser welding at the linear portion 117 and the start of the laser welding at the linear portion 118 are performed before molten metal of the screw portion 116 solidifies.

Although the laser welding device according to the present embodiment and the welding method using the same are different from those of the first embodiment and the like in that the two linear portions 117 and 118 extending so as to be separated from the screw portion 116 are formed, the same effects as those of the first embodiment and the like can be obtained.

While in the present embodiment, the two linear portions 117 and 118 being linear in a plan view are formed for the screw portion 116, the number of linear portions may be three or more. For example, it is also possible to adopt a form in which three linear portions are provided so as to be separated from each other by 120 degrees or a form in which four linear portions are provided so as to be separated from each other by 90 degrees. At this time, it is necessary to start the welding of any of the linear portions before the molten metal of the screw portion solidifies.

Fifth Embodiment

Figure 5D:
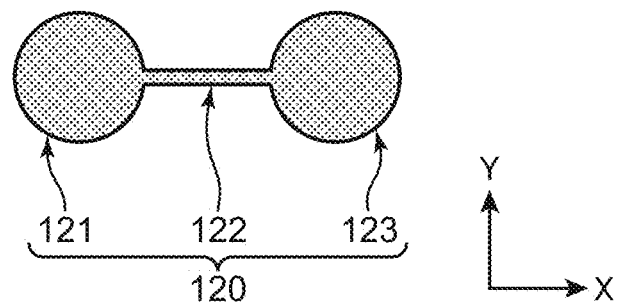
FIG. 5D is a schematic view illustrating a welding mode according to a fifth embodiment.

FIG. 5D is a schematic view illustrating a welding mode according to a fifth embodiment. A fundamental configuration of a laser welding device used for laser welding according to the present embodiment is basically the same as that of the first embodiment.

As illustrated in FIG. 5D, in the laser welding device according to the present embodiment, laser welding is performed to form a welding portion (nugget) 120 including a screw portion (first screw portion) 121 having a substantially circular shape in a plan view, a linear portion 122 continuous with the screw portion 121 and extending linearly in a plan view; and a screw portion (second screw portion) 123 continuous with the linear portion 122 and having a substantially circular shape in a plan view.

In the screw portion 121 and the screw portion 123, similarly to the screw portion 101 according to the first embodiment, a spot of a laser beam is caused to circle around a predetermined position, thereby causing metal of a relevant part to be melted and stirred. Then, the linear portion 122 is continuously irradiated with the laser beam before the metal of the screw portion 121 is solidified.

Although the laser welding device according to the present embodiment and the welding method using the same are different from those of the first embodiment and the like in that the two screw portions 121 and 123 are provided at positions separated from each other, the same effects as those of the first embodiment and the like can be obtained.

In addition, in the laser welding device according to the present embodiment and the welding method using the same, it is possible to ensure higher joining strength by providing the welding portion 120 including the two screw portions 121 and 123 and one linear portion 122.

Sixth Embodiment

Figure 6A:
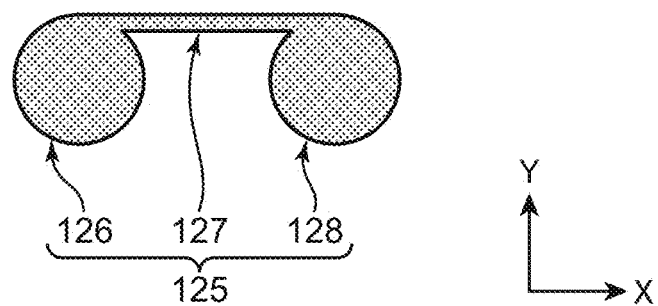
FIG. 6A is a schematic view illustrating a welding mode according to a sixth embodiment.

FIG. 6A is a schematic view illustrating a welding mode according to a sixth embodiment.

As illustrated in FIG. 6A, in a laser welding device according to the present embodiment, laser welding is performed to form a welding portion (nugget) 125 including a screw portion (first screw portion) 126 having a substantially circular shape in a plan view, a linear portion 127 continuous with the screw portion 126 and extending linearly in a plan view, and a screw portion (second screw portion) 128 continuous with the linear portion 127 and having a substantially circular shape in a plan view.

In the screw portion 126 and the screw portion 128, similarly to the screw portion 101 according to the first embodiment, a spot of a laser beam is caused to circle around a predetermined position, thereby causing metal of a relevant part to be melted and stirred. Then, the linear portion 127 is continuously irradiated with the laser beam before the metal of the screw portion 126 is solidified.

As illustrated in FIG. 6A, the linear portion 127 of the welding portion 123 according to the present embodiment has a different position of connection with the screw portion 126 and the screw portion 128 from that of the fifth embodiment. In other words, in the welding portion 125 according to the present embodiment, the linear portion 127 is connected to the screw portion 126 and the screw portion 128 so as to form a tangent at one end in the radial direction of each of the screw portions.

Although in the laser welding device according to the present embodiment and the welding method using the same, the form of the welding portion 125 is different from that of the fifth embodiment, the same effects as those of the fifth embodiment can be obtained.

Seventh Embodiment

Figure 6B:
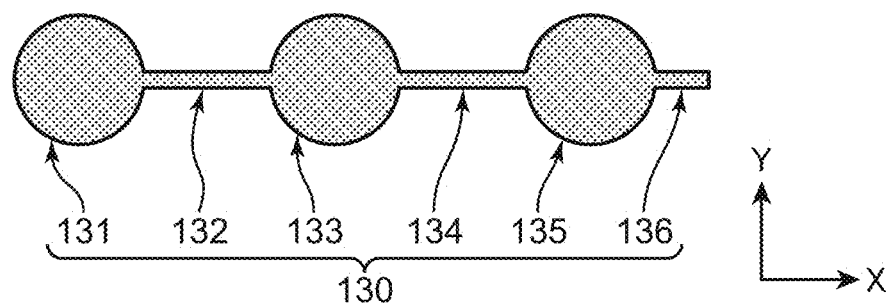
FIG. 6B is a schematic view illustrating a welding mode according to a seventh embodiment.

FIG. 6B is a schematic view illustrating a welding mode according to a seventh embodiment.

As illustrated in FIG. 6B, in a laser welding device according to the present embodiment, laser welding is performed to form a welding portion (nugget) 130 including a screw portion 131 having a substantially circular shape in a plan view, a linear portion 132 continuous with the screw portion 131 and extending linearly in a plan view, a screw portion (second screw portion) 133 continuous with the linear portion 132 and having a substantially circular shape in a plan view, a linear portion 134 continuous with the screw portion 133 and extending linearly in a plan view, a screw portion 135 continuous with the linear portion 134 and having a substantially circular shape in a plan view, and a linear portion 136 continuous with the screw portion 135 and being linear in a plan view. Although only the three screw portions 131, 133, and 135 and the three linear portions 132, 134, and 136 are illustrated in FIG. 6B, in the laser welding according to the present embodiment, further screw portions and linear portions may be continuous thereto.

In the screw portions 131, 133, and 135, similarly to the screw portion 101 according to the first embodiment, a spot of a laser beam is caused to circle around a predetermined position, thereby causing metal of a relevant part to be melted and stirred. Then, each irradiation is continuously performed, irradiation of the linear portion 132 with a laser beam before the metal of the screw portion 131 is solidified, irradiation of the linear portion 134 before the metal of the screw portion 133 is solidified, and irradiation of the linear portion 136 before the metal of the screw portion 135 is solidified.

As illustrated in FIG. 6B, the welding portion 130 according to the present embodiment is different from that of the fifth embodiment in the number of the screw portions 131, 133, and 135 and the number of the linear portions 132, 134, and 136 in the configuration.

Although in the laser welding device according to the present embodiment and the welding method using the same, the form of the welding portion 130 is different from that of the fifth embodiment, the same effects as those of the fifth embodiment can be obtained. In addition, in the present embodiment, by forming the welding portion 130 including the screw portions 131, 133, and 135 and the linear portions 132, 134, and 136 more than in the fifth embodiment and the sixth embodiment, it is possible to ensure higher joining strength while increasing the welding speed.

Eighth Embodiment

Figure 6C:
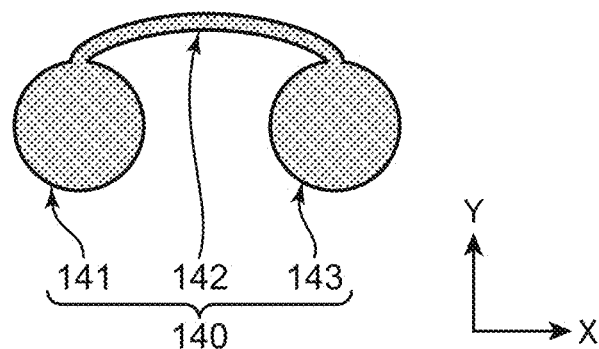
FIG. 6C is a schematic view illustrating a welding mode according to an eighth embodiment.

FIG. 6C is a schematic view illustrating a welding mode according to an eighth embodiment.

As illustrated in FIG. 6C, in a laser welding device according to the present embodiment, laser welding is performed to form a welding portion (nugget) 140 including a screw portion (first screw portion) 141 having a substantially circular shape in a plan view, a linear portion 142 continuous with the screw portion 141 and extending linearly in a plan view, and a screw portion (second screw portion) 143 continuous with the linear portion 142 and having a substantially circular shape in a plan view.

In the screw portion 141 and the screw portion 143, similarly to the screw portion 101 according to the first embodiment, a spot of a laser beam is caused to circle around a predetermined position, thereby causing metal of a relevant part to be melted and stirred. Then, the linear portion 142 is continuously irradiated with the laser beam before the metal of the screw portion 141 is solidified.

As shown in FIG. 6C, while being the same as the sixth embodiment in that the linear portion 142 is connected to one end portion in the radial direction of each of the screw portion 141 and the screw portion 143, the welding portion 140 according to the present embodiment is different from the sixth embodiment in that the linear portion 142 has a curved shape in a plan view (as an example, an arc shape in a plan view in the present embodiment).

Although in the laser welding device according to the present embodiment and the welding method using the same, the form of the welding portion 140 is different from that of the fifth embodiment and the like, the same effects as those of the fifth embodiment can be obtained. Further, in the present embodiment, since the linear portion 142 in the welding portion 140 is formed to have an arc shape in a plan view, the locus of the spot of the laser beam in the linear portion 142 can be made long, so that higher joining strength can be ensured as compared with a case where the linear portion is formed to be linear in a plan view.

Ninth Embodiment

Figure 6D:
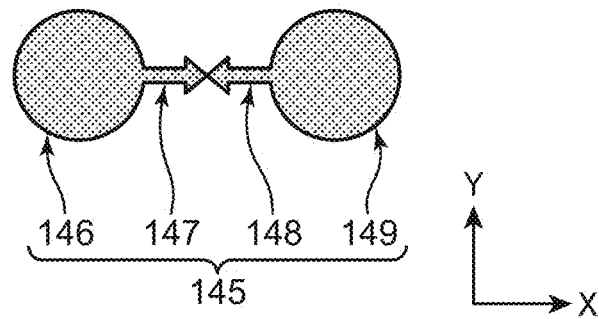
FIG. 6D is a schematic view illustrating a welding mode according to a ninth embodiment.

FIG. 6D is a schematic view illustrating a welding mode according to a ninth embodiment.

As illustrated in FIG. 6D, in the laser welding device according to the present embodiment, a screw portion 146 having a substantially circular shape in a plan view is formed by laser welding, and a linear portion 147 being linear in a plan view is formed so as to be separated from the screw portion 146 while a metal member of the screw portion 146 is in a molten state. Then, a screw portion 149 having a substantially circular shape in a plan view is formed at a position separated from the screw portion 146 and the linear portion 147, and a linear portion 148 being linear in a plan view is formed so as to be separated from the screw portion 149 and to approach the screw portion 146 while a metal member of the screw portion 149 is in a molten state. The linear portion 147 and the linear portion 148 may be finally connected or not connected in a state in which at a front end portion of each scanning locus, a molten state of the metal is maintained. In the present embodiment, a welding portion 145 including the two screw portions 146 and 149 and the two linear portions 147 and 148 is formed through the above steps.

Although the laser welding device according to the present embodiment and the welding method using the same are different from those of the fifth embodiment and the like in the order of forming the screw portions 146 and 149 and the linear portions 147 and 148, the same effects as those of the fifth embodiment can be obtained.

In addition, when the form of the welding portion is made similar to that of the fifth embodiment, rigidity can be effectively improved by setting an extension length of the linear portion 122 in the X direction be larger.

However, in a case of trying to increase the length of extension of the linear portion 122 in the X direction in the fifth embodiment, an amount of molten metal flowing into the gap G between the plate materials in the linear portion 122 becomes insufficient depending on conditions, so that sufficient joining strength might not be ensured. In such a case, since with the use of the welding device according to the present embodiment, the linear portions 147 and 148 can be joined by pouring a part of stirred molten metal of the screw portions 146 and 149, sufficient molten metal can be poured into the linear portions 147 and 148, so that high joining strength can be ensured.

Tenth Embodiment

Figure 7A:
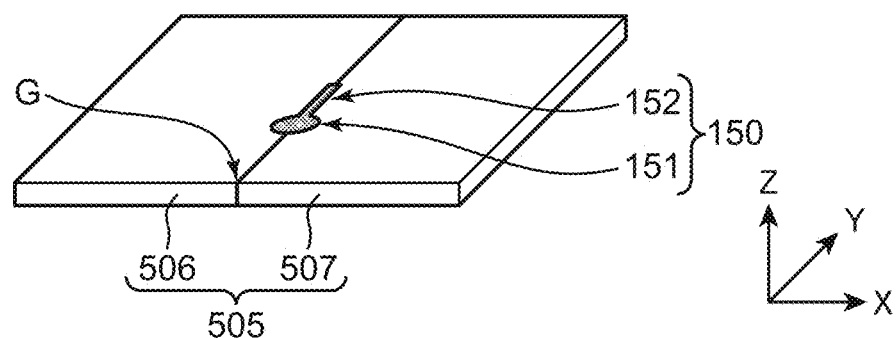
FIG. 7A is a schematic perspective view illustrating a welding mode according to a tenth embodiment.

FIG. 7A is a schematic perspective view tier explaining a welding method according to a tenth embodiment.

As illustrated in FIG. 7A, a member set 505 to be welded by the laser welding method according to the present embodiment is configured by a combination of a plate member (metal member) 506 and a plate member (metal member) 507. The plate members 506 and 507 to be welded are disposed in a different manner from the first embodiment, the plate member 506 and the plate member 507 being disposed with end faces thereof abutting against each other in the X direction. In a state before welding, a gap is present partly therebetween.

As illustrated in FIG. 7A, in the laser welding device according to the present embodiment, laser welding is performed to form a welding portion (nugget) 150 including a screw portion 151 having a substantially circular shape in a plan view and a linear portion 152 continuous with the screw portion 151 and extending linearly in a plan view toward the Y direction. In the present embodiment, the screw portion 151 and the linear portion 152 are continuously formed along the butted part between the plate member 506 and the plate member 507.

Each method for forming the screw portion 151 and the linear portion 152 is the same as that in the first embodiment.

Although in the laser welding device according to the present embodiment and the welding method using the same, the arrangement form of the plate members 506 and 507 is different from that of the first embodiment, the same effects as those of the first embodiment can be obtained. At the time of forming the linear portion 152 using laser welding, a part of molten metal of the screw portion 151 flows into the gap G, so that firm welding can be realized.

Eleventh Embodiment

Figure 7B:
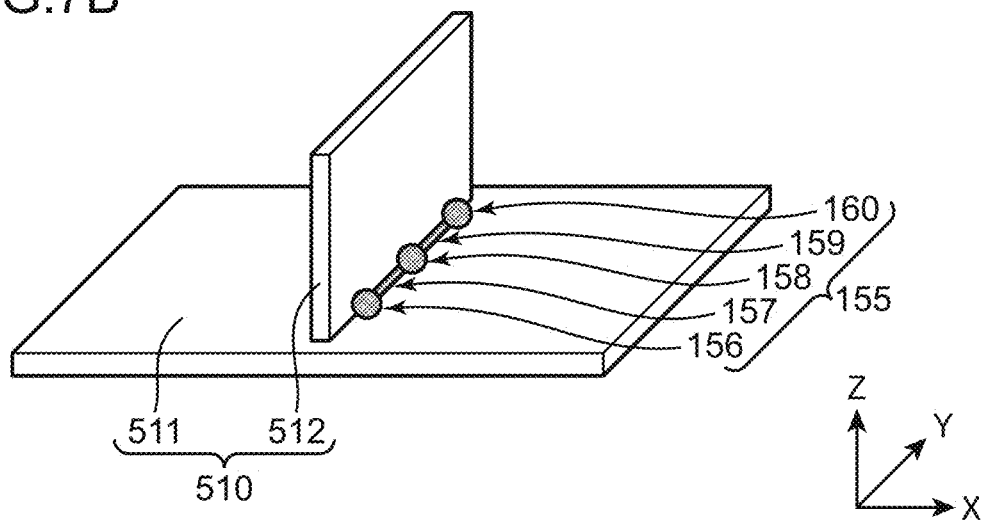
FIG. 7B is a schematic perspective view illustrating a welding mode according to an eleventh embodiment.

FIG. 7B is a schematic perspective view for explaining a welding method according to an eleventh embodiment.

As illustrated in FIG. 7B, a member set 510 to be welded by the laser welding method according to the present embodiment is configured by a combination of a plate member (metal member) 511 and a plate member (metal member) 512. The plate members 511 and 512 to be welded are disposed in a manner different from the first embodiment, and the plate member 512 is disposed on a main face of the plate member 511 in a state of being erected in the Z direction. A gap is formed partly between the main face of the plate member 511 and an end face of the plate member 512.

As illustrated in FIG. 7B, in the laser welding device according to the present embodiment, laser welding is performed to form a welding portion (nugget) 155 including a screw portion 156 having a substantially circular shape in a plan view, a linear portion 157 continuous with the screw portion 156 and extending linearly in a plan view toward the Y direction, a screw portion 158 continuous with the linear portion 157 and having a substantially circular shape in a plan view, a linear portion 159 continuous with the screw portion 158 and extending linearly in a plan view toward the Y direction, and a screw portion 160 continuous with the linear portion 159 and having a substantially circular shape in a plan view. In the present embodiment, the screw portions 156, 158, and 160 and the linear portions 157 and 159 are continuously formed in the Y direction along a lower end side in the Z direction of the plate member 512.

Each method for forming the screw portions 156, 158, and 160 and the linear portions 157 and 159 is the same as that of the fifth embodiment and the like.

Although in the laser welding device according to the present embodiment and the welding method using the same, the arrangement form of the plate members 511 and 512 and the form of the welding portion 155 are different from those of the fifth embodiment, the same effects as those of the fifth embodiment can be obtained. At the time of forming the linear portion 157 using laser welding, a part of molten metal of the screw portion 156 flows into the gap, and at the time of forming the linear portion 159, a part of molten metal of the screw portion 158 flows into the gap, so that firm welding can be realized.

Twelfth Embodiment

Figure 7C:
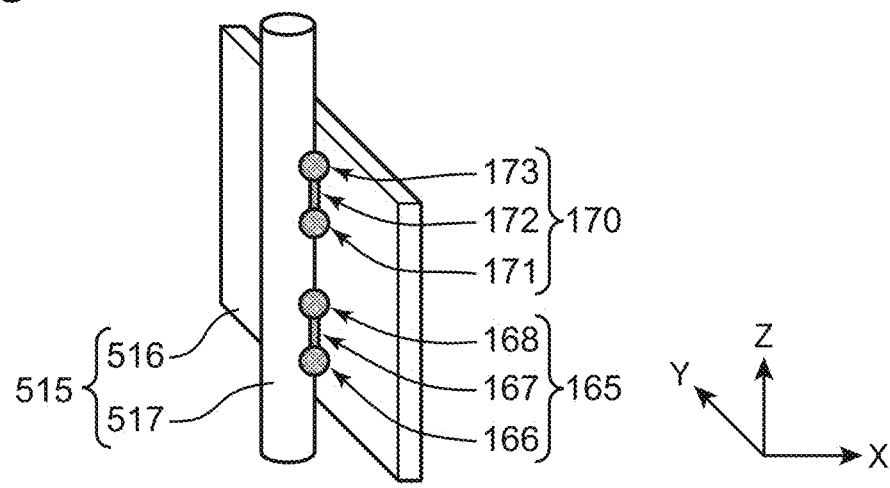
FIG. 7C is a schematic perspective view illustrating a welding mode according to a twelfth embodiment.

FIG. 7C is a schematic perspective view for explaining a welding method according to a twelfth embodiment.

As illustrated in FIG. 7C, a member set 515 to be welded by the laser welding method according to the present embodiment is configured by a combination of a plate member (metal member) 516 and a bar member (metal member) 517. The bar member 517 is disposed in line contact with a main face of the plate member 516. Since in the present embodiment, the columnar bar member 517 is adopted, a gap is formed on circumferential both sides of the bar member 517, the sides being a contact part with the plate member 516.

As illustrated in FIG. 7C, in the laser welding device according to the present embodiment, laser welding is performed to form a welding portion (nugget) 170 including a screw portion 173 having a substantially circular shape in a plan view, a linear portion 172 continuous with the screw portion 173 and extending linearly in a plan view toward the Z direction, and a screw portion 171 continuous with the linear portion 172 and having a substantially circular shape in a plan view. Further, in the laser welding according to the present embodiment, a welding portion (nugget) 165 is formed which includes a screw portion 168 separated from the screw portion 171 in the Z direction and having a substantially circular shape in a plan view, a linear portion 167 continuous with the screw portion 168 and extending linearly in a plan view toward the Z direction, and a screw portion 166 continuous with the linear portion 167 and having a substantially circular shape in a plan view.

A method for forming the welding portions 165 and 170 is the same as that in the fifth embodiment and the like.

Although in the laser welding device according to the present embodiment and the welding method using the same, the configuration of the member set 515 is different from that of the fifth embodiment, the same effects as those of the fifth embodiment can be obtained. At the time of forming the linear portions 167 and 172 using laser welding, a part of molten metal of the screw portions 168 and 173 flows into a part of the gap between the plate member 516 and the bar member 517, so that firm welding can be realized.

Thirteenth Embodiment

Figure 8A:
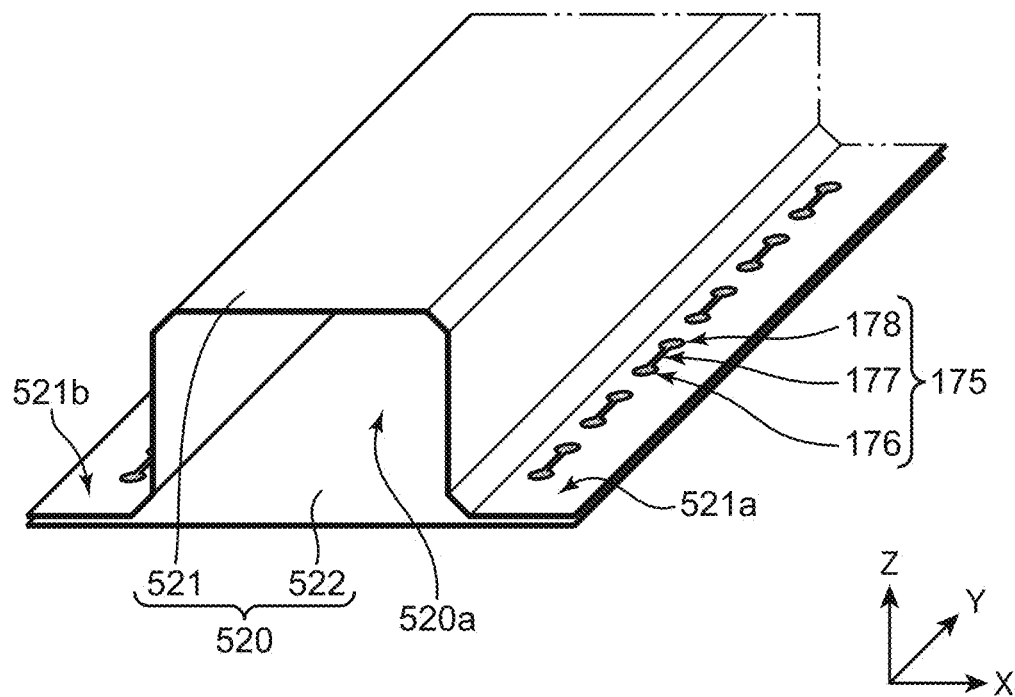
FIG. 8A is a schematic perspective view illustrating a welding mode according to a thirteenth embodiment.

FIG. 8A is a schematic perspective view for explaining a welding method according to a thirteenth embodiment.

As illustrated in FIG. 8A, a member set 520 to be welded by the laser welding method according to the present embodiment is configured by a combination of a hat-shaped member (metal member) 521 whose cross section is bent into a substantially hat shape and a plate member (metal member) 522. The hat-shaped member 521 has flange portions 521a and 521b on both side parts thereof in the X direction. Then, the hat-shaped member 521 is overlapped with the plate member 522 at the flange portions 521a and 521b. In the present embodiment, in a state before welding, a gap is formed partly between the flange portions 521a and 521b of the hat-shaped member 521 and the plate member 522.

As illustrated in FIG. 8A, in the laser welding device according to the present embodiment, laser welding is performed to form, in each of the flange portions 521a and 521b, a plurality of welding portions (nuggets) 175 each including a screw portion 176 having a substantially circular shape in a plan view, a linear portion 177 continuous with the screw portion 176 and linearly extending in a plan view toward the Y direction, and a screw portion 178 continuous with the linear portion 177 and having a substantially circular shape in a plan view. As a result, a pipe body (for example, a crash box) having a hollow portion 520a is formed.

A method for forming the welding portion 175 is the same as that in the fifth embodiment and the like.

Although the laser welding device according to the present embodiment and the welding method using the same are different from those of the fifth embodiment in the configuration of the member set 520 and the formation of the plurality of welding portions 175 in the flange portions 521a and 521b, the same effects as those of the fifth embodiment can be obtained. Also in the present embodiment, at the time of forming the linear portion 177 using laser welding, a part of molten metal of the screw portion 176 flows into a part of the gap between the flange portions 521a and 521b of the hat-shaped member 521 and the plate member 522, so that firm welding can be realized.

Fourteenth Embodiment

Figure 8B:
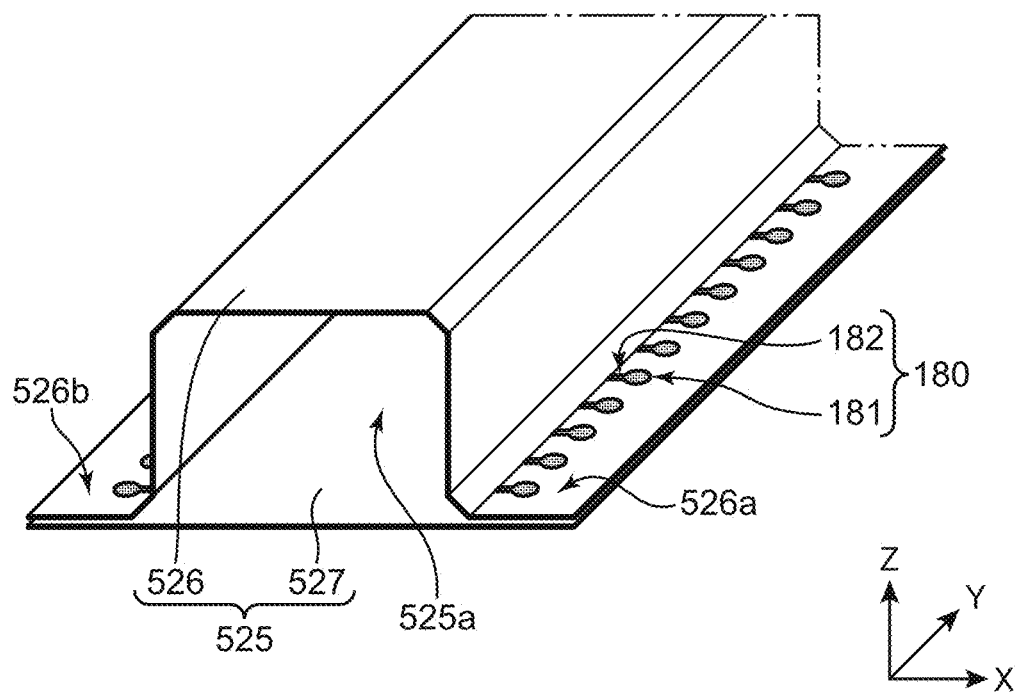
FIG. 8B is a schematic perspective view illustrating a welding mode according to a fourteenth embodiment.

FIG. 8B is a schematic perspective view for explaining a welding method according to a fourteenth embodiment.

As illustrated in FIG. 8B, a member set 525 to be welded by the laser welding method according to the present embodiment is also configured by a combination of a hat-shaped member (metal member) 526 whose cross section is bent into a substantially hat shape and a plate member (metal member) 527, similarly to the thirteenth embodiment. The hat-shaped member 526 is also the same as that of the thirteenth embodiment in having flange portions 526a and 526b on both side parts thereof in the X direction. Also in the present embodiment, in a state before welding, a gap is formed partly between the flange portions 526a and 526b of the hat-shaped member 526 and the plate member 527.

As illustrated in FIG. 8B, in the laser welding device according to the present embodiment, laser welding is performed to form, in each of the flange portions 526a and 526b, a plurality of welding portions (nuggets) 180 each including a screw portion 181 having a substantially circular shape in a plan view and a linear portion 182 continuous with the screw portion 181 and extending linearly in a plan view toward a hollow portion 525a in the X direction. As a result, a pipe body (for example, a crash box) having the hollow portion 525a is formed.

A method for forming the welding portion 180 is the same as that in the first embodiment and the like.

Although in the laser welding device according to the present embodiment and the welding method using the same, the form of each welding portion 180 is different from that of the thirteenth embodiment, the same effects as those of the thirteenth embodiment can be obtained. Also in the present embodiment, at the time of forming the linear portion 182 using laser welding, a part of molten metal of the screw portion 181 flows into the gap between the flange portions 526a and 526b of the hat-shaped member 526 and the plate member 527, so that firm welding can be realized.

Figure 9A:
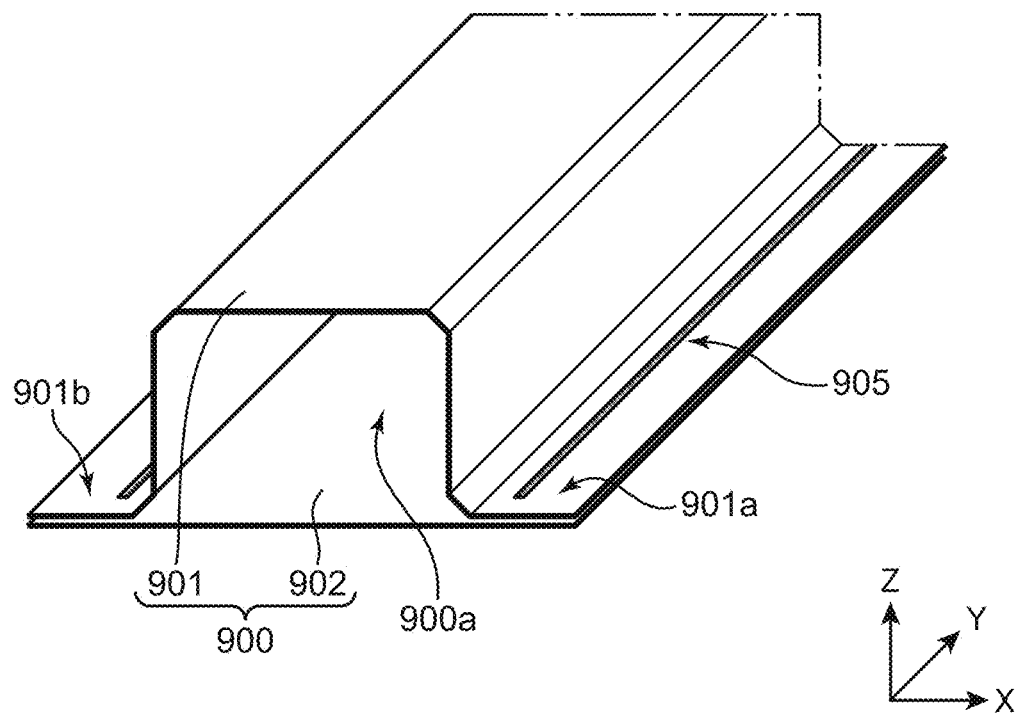
FIG. 9A is a schematic perspective view illustrating a welding mode according to Comparative Example 1.
Figure 9B:
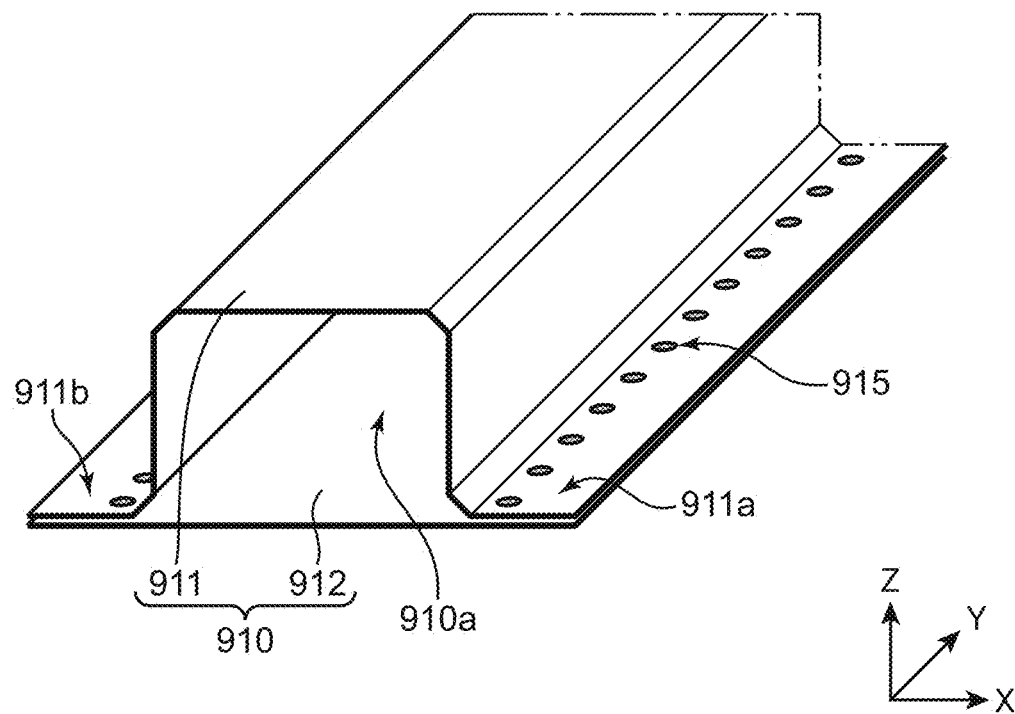
FIG. 9B is a schematic perspective view illustrating a welding mode according to Comparative Example 2.
Figure 10A:
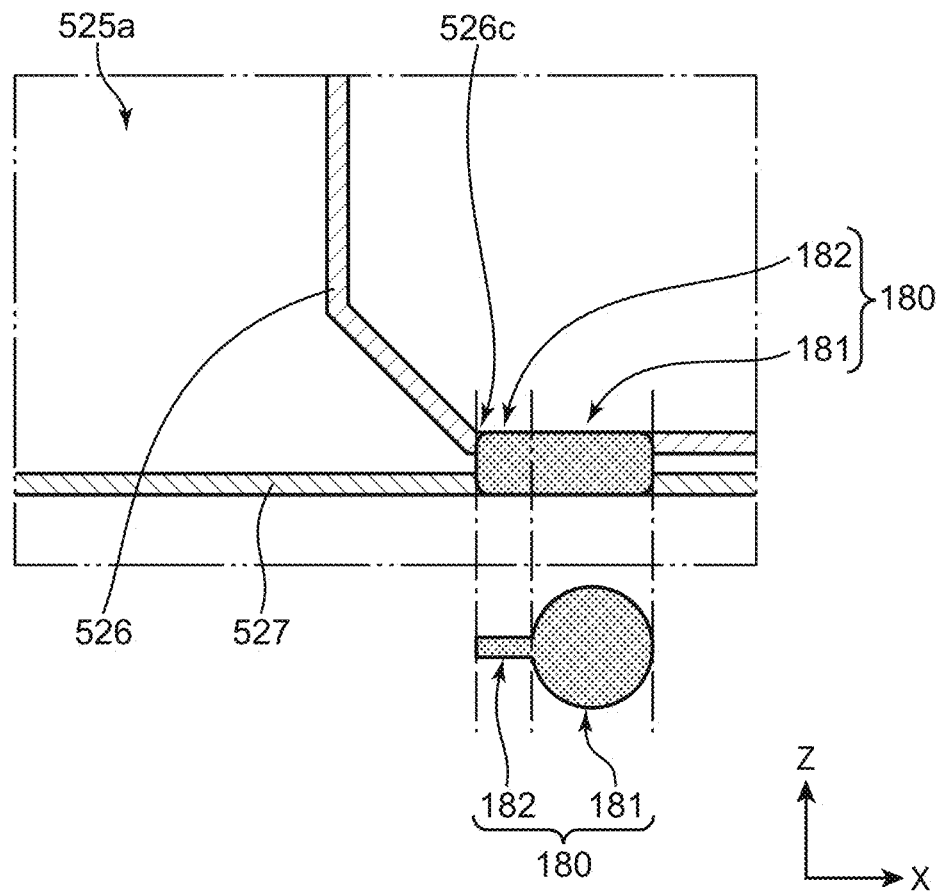
FIG. 10A is a schematic cross-sectional view illustrating a configuration of a welding position and a peripheral part thereof according to the fourteenth embodiment.
Figure 10B:
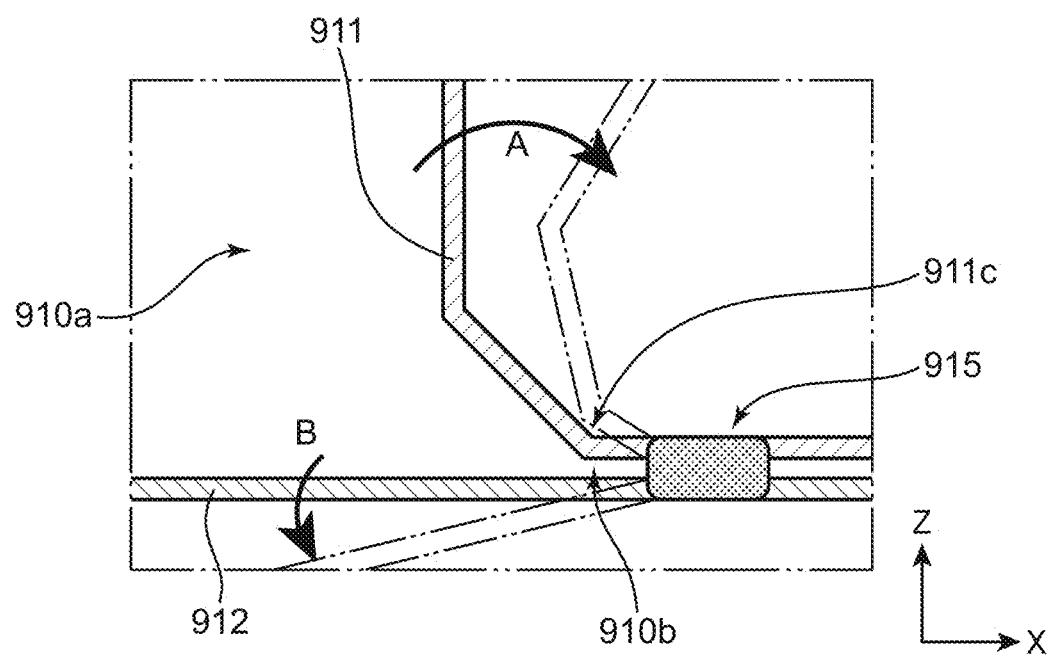
FIG. 10B is a schematic cross-sectional view illustrating a configuration of a welding position and a peripheral part thereof according to Comparative Example 2.

Furthermore, in the present embodiment, by forming the linear portion 182 of the welding portion 180 toward the hollow portion 525a, an amount of deformation at the time of load application to the crash box can be suppressed, so that rigidity can be improved. This will be described with reference to FIG. 9A, FIG. 9B, FIG. 10A, and FIG. 10B. FIG. 9A is a schematic perspective view illustrating a welding mode according to Comparative Example 1, and FIG. 9B is a schematic perspective view illustrating a welding mode according to Comparative Example 2. FIG. 10A is a schematic cross-sectional view illustrating a configuration of a welding position and a peripheral part thereof according to the present embodiment, and FIG. 10B is a schematic cross-sectional view illustrating a configuration of a welding position and a peripheral part thereof according to Comparative Example 2.

As illustrated in FIG. 9A, a member set 900 to be welded by a laser welding method according to Comparative Example 1 is also configured by a combination of a hat-shaped member 901 whose cross section is bent into a substantially hat shape and a plate member 902. In a state before welding, substantially no gap is formed between flange portions 901a and 901b of the hat-shaped member 901 and the plate member 902.

In a laser welding device according to Comparative Example 1, a welding portion 905 extending in the Y direction is formed in each of the flange portions 901a and 901b, thereby forming a pipe body (crash box) having a hollow portion 900a.

While the linearly continuous welding according to Comparative Example 1 illustrated in FIG. 9A enables the welding portion 905 to be welded up to a corner related to bending of the hat-shaped member 901, in a case where a gap is formed between the flange portions 901a and 901b of the hat-shaped member 901 and the plate member 902, joining is not possible.

Therefore, laser welding according to Comparative Example 2 as illustrated in FIG. 9B may be adopted.

As illustrated in FIG. 9B, a member set 910 to be welded by a laser welding method according to Comparative Example 2 is also configured by a combination of a hat-shaped member 911 whose cross section is bent into a substantially hat shape and a plate member 912. In a state before welding, a gap is formed partly between flange portions 911a and 911b of the hat-shaped member 911 and the plate member 912.

In a laser welding device according to Comparative Example 2, a plurality of welding portions (screw portions having a substantially circular shape in a plan view) 915 are formed at intervals from each other in each of the flange portions 911a and 911b, thereby forming a pipe body (crash box) having a hollow portion 910a.

In a case of adopting the laser welding according to Comparative Example 2 illustrated in FIG. 9B, even when a gap is formed partly between the flange portions 911a and 911b of the hat-shaped member 911 and the plate member 912 in the state before welding, joining can be performed. As illustrated in FIG. 10B, in a case of adopting the laser welding according to Comparative Example 2, the welding portion 915 is formed at a position slightly separated in the X direction from a corner 911c related to the bending of the hat-shaped member 911. Therefore, at the corner 911c, no metal flows into between the corner and the plate member 912, and a gap 910b remains unoccupied.

Therefore, in a case of adopting the laser welding method according to Comparative Example 2, when a load is applied to the crash box formed by joining, such deformation as indicated by arrows A and B occurs to make it difficult to ensure high rigidity.

As a countermeasure thereto, by bringing the welding portion 915 close to the corner 911c related to the bending of the hat-shaped member 911, such deformation as illustrated in FIG. 10B can be suppressed.

However, since each welding portion (screw portion) 915 has a low peeling strength, it is necessary to increase the number of welding portions 915 in order to ensure rigidity. Therefore, it is considered that a problem of a decrease in productivity occurs.

By contrast, as illustrated in FIG. 10A, in the laser welding method according to the present embodiment, by forming the linear portion 182 continuous with the screw portion 181 so as to extend to a corner 526c related to bending of the hat-shaped member 526, a part of molten metal of the screw portion 181 can be poured also into the gap between the flange portions 526a and 526b of the hat-shaped member 526 and the plate member 527 at the corner 526c. In other words, even when a gap is formed between the flange portions 526a and 526b of the hat-shaped member (metal member) 526 and the plate member (metal member) 527, the linear portion 182 can be formed, and the joining strength can be improved as compared with the case of adopting the laser welding according to Comparative Example 2 in which the welding portion 915 solely including the screw portion is formed.

Therefore, in a case of adopting the laser welding method according to the present embodiment, deformation hardly occurs even when a load is applied to a crash box formed by joining, so that high rigidity can be ensured.

Fifteenth Embodiment

Figure 11:
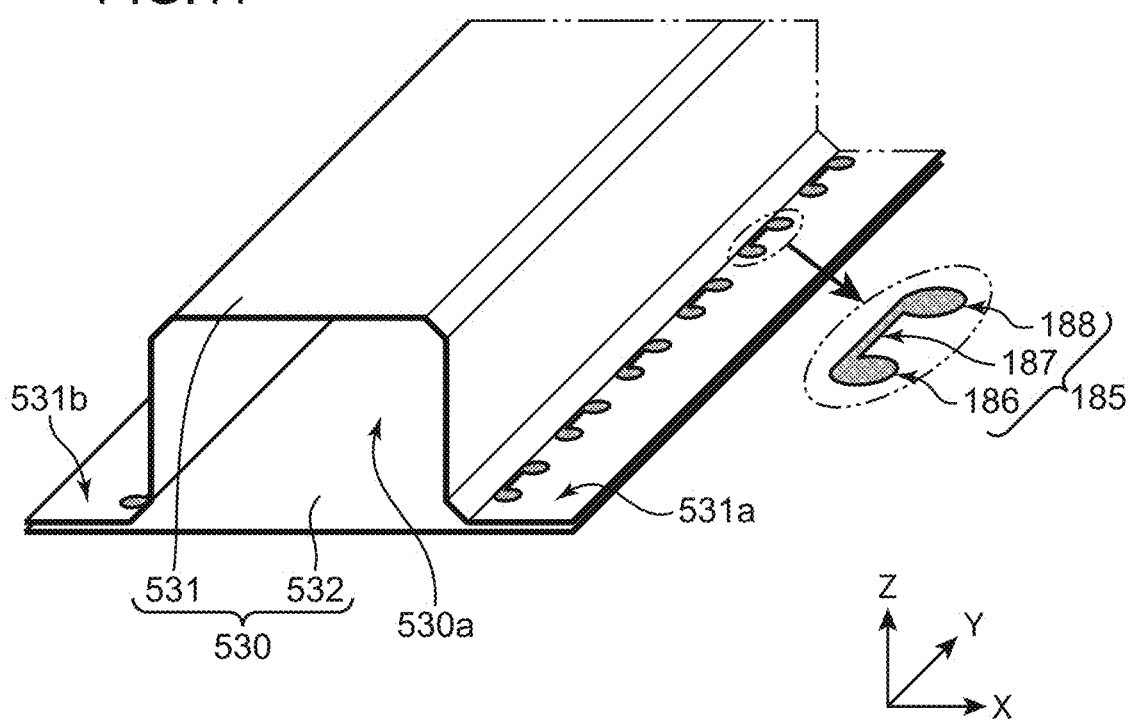
FIG. 11 is a schematic perspective view illustrating a welding mode according to a fifteenth embodiment of the present invention.

FIG. 11 is a schematic perspective view for explaining a welding method according to a fifteenth embodiment.

As illustrated in FIG. 11, a member set 530 to be welded by the laser welding method according to the present embodiment is also configured by a combination of a hat-shaped member (metal member) 531 whose cross section is bent into a substantially hat shape and a plate member (metal member) 532. The hat-shaped member 531 has flange portions 531a and 531b on both side parts in the X direction. The hat-shaped member 531 is overlapped with the plate member 532 at the flange portions 531a and 531b. Also in the present embodiment, in a state before welding, a gap is formed partly between the flange portions 531a and 531b of the hat-shaped member 531 and the plate member 532.

As illustrated in FIG. 11, in the laser welding device according to the present embodiment, laser welding is performed to form, in each of the flange portions 531a and 531b, a plurality of welding portions (nuggets) 185 each including a screw portion (first screw portion) 186 having a substantially circular shape in a plan view, a linear portion 187 continuous with the screw portion 186 and linearly extending in a plan view toward the Y direction, and a screw portion (second screw portion) 188 continuous with the linear portion 187 and having a substantially circular shape in a plan view. As a result, a pipe body (for example, a crash box) having a hollow portion 530a is formed.

A method for forming the welding portion 185 is the same as that in the sixth embodiment.

The laser welding device according to the present embodiment and the welding method using the same are different from those of the thirteenth embodiment in that the linear portion 187 in each of the plurality of welding portions 185 is formed along a corner related to bending of the hat-shaped member 531. Therefore, in addition to the effects produced by the above-described thirteenth embodiment, the present embodiment makes deformation in a case where a load is applied occur further less likely, so that higher rigidity can be ensured.

Sixteenth Embodiment

FIG. 12A is a schematic view illustrating a welding mode according to a sixteenth embodiment. The sixteenth embodiment is different from the first embodiment and the like in a form of a linear portion formed continuously with a screw portion.

As shown in FIG. 12A, in a laser welding method according to the present embodiment, welding is performed continuously with the formation of the screw portion (before molten metal of the screw portion is solidified) while spirally turning a spot of the laser beam in a plan view (scanning on a laser beam scanning locus $LN_{190}$), thereby forming a linear portion 190.

Although the laser welding device according to the present embodiment and the welding method using the same are different from those of the first embodiment and the like in having the laser beam scanning locus $LN_{190}$ at the time of forming the linear portion 190, the same effects as those of the first embodiment can be obtained.

Furthermore, since in the laser welding device according to the present embodiment and the welding method using the same, the linear portion 190 is formed while the spot of the laser beam is spirally turned in a plan view, the laser beam scanning locus $LN_{190}$ can be made longer than that in a case of scanning linearly in a plan view, so that joining strength can be improved by forming the linear portion 190 thick in the Y direction. Further, since a molten state of the linear portion can be maintained for a long period of time by spirally turning the laser beam scanning locus $LN_{190}$, a length becomes long in which the gap between the metal members can be filled with the molten metal, resulting in enabling the linear portion to be formed long.

Seventeenth Embodiment

FIG. 12B is a schematic view illustrating a welding mode according to a seventeenth embodiment. Similarly to the sixteenth embodiment, the seventeenth embodiment is different from the first embodiment and the like in a form of a linear portion formed continuously with the screw portion.

As shown in FIG. 12B, in a laser welding method according to the present embodiment, welding is performed continuously with the formation of the screw portion (while a metal member of the screw portion is in a molten state) while scanning a spot of a laser beam in a zigzag manner in a plan view (scanning on a laser beam scanning locus $LN_{195}$), thereby forming a linear portion 195.

Although the laser welding device according to the present embodiment and the welding method using the same are different from those of the first embodiment and the like in the laser beam scanning locus $LN_{195}$ at the time of forming the linear portion 195, the same effects as those of the first embodiment and the like can be obtained.

Furthermore, since in the laser welding device according to the present embodiment and the welding method using the same, the linear portion 195 is formed while scanning a spot of the laser beam in a zigzag manner in a plan view, the laser beam scanning locus $LN_{195}$ can be made longer than in a case of scanning linearly in a plan view, so that joining strength can be improved by forming the linear portion 195 thick in the Y direction, similarly to the sixteenth embodiment. In addition, a length becomes long in which the gap between the metal members can be filled with the molten metal, resulting in enabling the linear portion to be formed long.

Eighteenth Embodiment

Figure 13A:
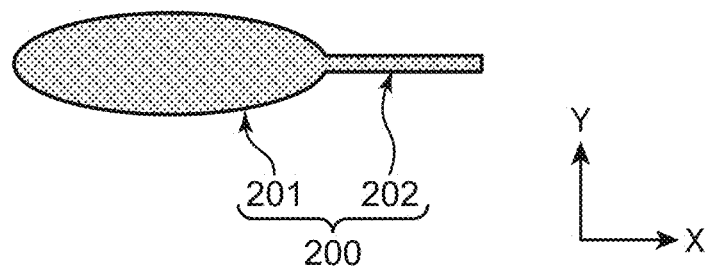
FIG. 13A is a schematic view illustrating a welding mode according to an eighteenth embodiment.

FIG. 13A is a schematic view illustrating a welding mode according to an eighteenth embodiment.

As illustrated in FIG. 13A, in a laser welding device according to the present embodiment, laser welding is performed to form a welding portion (nugget) 200 including a screw portion 201 having a substantially elliptical shape in a plan view or a substantially elongated shape in a plan view and a linear portion 202 continuous with the screw portion 201 and extending linearly in a plan view. In other words, the present embodiment is different from the first embodiment and the like in that the screw portion 201 having a substantially elliptical shape in a plan view or a substantially elongated shape in a plan view is formed as an example of a dot shape in a plan view, the first embodiment and the like in which the screw portion 101 having a substantially circular shape in a plan view is formed as an example of a dot shape in a plan view.

The screw portion 201 is formed by causing a spot of a laser beam to circle around a predetermined position in a substantially elliptical manner in a plan view or a substantially elongated circular manner in a plan view.

Although in the laser welding device according to the present embodiment and the welding method using the same, the form of the welding portion 200 is different from that of the first embodiment and the like, the same effects as those of the first embodiment and the like can be obtained.

Nineteenth Embodiment

Figure 13B:
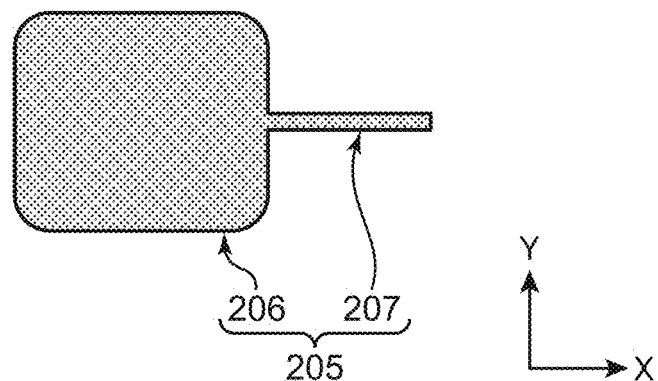
FIG. 13B is a schematic view illustrating a welding mode according to a nineteenth embodiment.

FIG. 13B is a schematic view illustrating a welding mode according to a nineteenth embodiment.

As illustrated in FIG. 13B, in a laser welding device according to the present embodiment, laser welding is performed to form a welding portion (nugget) 205 including a screw portion 206 having a substantially rounded polygonal shape in a plan view (as an example, a rounded square in the present embodiment) and a linear portion 207 continuous with the screw portion 206 and extending linearly in a plan view.

The screw portion 206 is formed by causing a spot of a laser beam to circle around a predetermined position in a substantially polygonal manner in a plan view. In other words, the present embodiment is different from the first embodiment and the like in that the screw portion 206 having a substantially polygonal shape in a plan view is formed as an example of a dot shape in a plan view, the first embodiment and the like in which the screw portion 101 having a substantially circular shape in a plan view is formed as an example of a dot shape in a plan view.

Although in the laser welding device according to the present embodiment and the welding method using the same, the form of the welding portion 205 is different from that of the first embodiment and the like, the same effects as those of the first embodiment and the like can be obtained.

Twentieth Embodiment

Figure 13C:
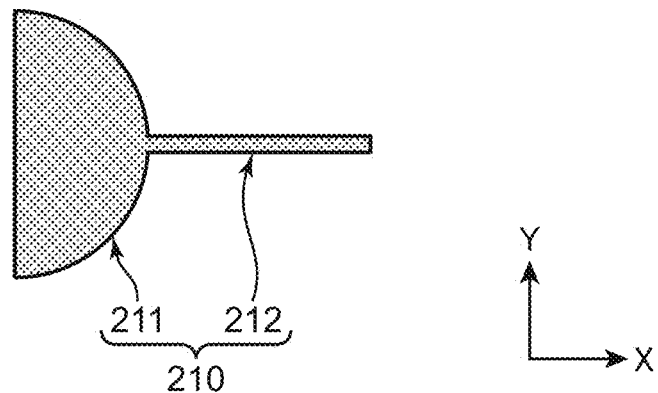
FIG. 13C is a schematic view illustrating a welding mode according to a twentieth embodiment.

FIG. 13C is a schematic view illustrating a welding mode according to a twentieth embodiment.

As illustrated in FIG. 13C, in a laser welding device according to the present embodiment, laser welding is performed to form a welding portion (nugget) 210 including a screw portion 211 having a substantially semicircular shape in a plan view and a linear portion 212 continuous with the screw portion 211 and extending linearly in a plan view.

The screw portion 211 is formed by causing a spot of a laser beam to circle around a predetermined position in a substantially semicircular manner in a plan1 view. In other words, the present embodiment is different from the first embodiment and the like in that the screw portion 211 having a substantially semicircular shape in a plan view is formed as an example of a dot shape in a plan view, the first embodiment and the like in which the screw portion 101 having a substantially circular shape in a plan view is formed as an example of a dot shape in a plan view.

Although in the laser welding device according to the present embodiment and the welding method using the same, the form of the welding portion 210 is different from that of the first embodiment and the like, the same effects as those of the first embodiment and the like can be obtained.

Twenty-First Embodiment

Figure 13D:
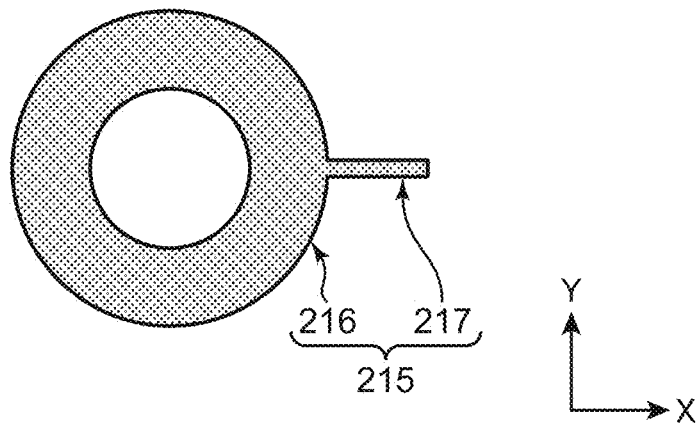
FIG. 13D is a schematic view illustrating a welding mode according to a twenty-first embodiment.

FIG. 13D is a schematic view illustrating a welding mode according to a twenty-first embodiment.

As illustrated in FIG. 13D, in a laser welding device according to the present embodiment, laser welding is performed to form a welding portion (nugget) 215 including a screw portion 216 having a substantially annular shape in a plan view (substantially doughnut shape in a plan view) and a linear portion 217 continuous with the screw portion 216 and extending linearly in a plan view.

The screw portion 216 is formed by causing a spot of a laser beam to circle around a predetermined position in a substantially annular shape in a plan view. In other words, the present embodiment is different from the first embodiment and the like in that the screw portion 216 having a substantially annular shape in a plan view is formed as an example of a dot shape in a plan view, the first embodiment and the like in which the screw portion 101 having a substantially circular shape in a plan view is formed as an example of a dot shape in a plan view.

Although in the laser welding device according to the present embodiment and the welding method using the same, the form of the welding portion 215 is different from that of the first embodiment and the like, the same effects as those of the first embodiment and the like can be obtained.

[Confirmatory Test]

1. Welding Method and State of Welding Portion (1) Welding Method and Welded Cross-Section FIG. 14A is a schematic view illustrating a welding mode of Sample 1 used in the present confirmation test.

Sample 1

Figure 14A:
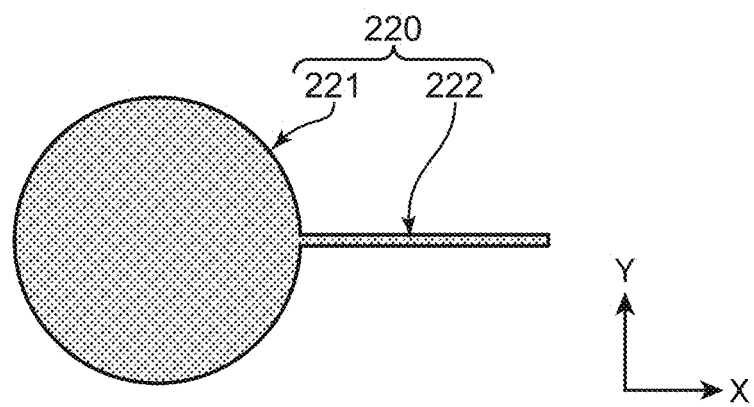
FIG. 14A is a schematic view illustrating a welding mode of Sample 1.

As shown in FIG. 14A, a welding portion 220 of Sample 1 includes a screw portion 221 and a linear portion 222 continuous with the screw portion. Sample 1 is a sample obtained by performing laser welding using steel plates (SPFC590) each having a size of 40 mm×100 mm and a plate thickness of 1.0 mm which are disposed with a gap of 0.5 mm therebetween. In the formation of the welding portion 220 of Sample 1, irradiation of the linear portion 222 with a laser beam was started while a molten state of metal of the screw portion 221 was maintained (before molten metal is solidified).

Sample 2

In the formation of Sample 2 as a comparative example of Sample 1, materials and equipment for use are the same as those of Sample 1. In addition, a welding mode after welding is also the mode shown in FIG. 14A similarly to Sample 1. Sample 2 is different from Sample 1 in that the irradiation of the linear portion with the laser beam was started 0.5 seconds after the irradiation of the screw portion with the laser beam was finished at the time of welding.

Figure 15A:
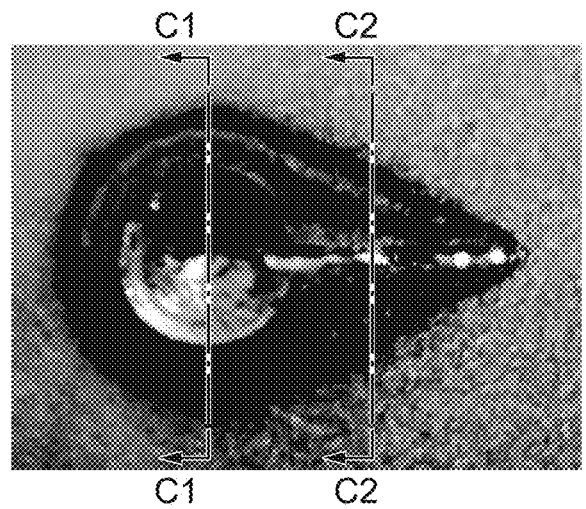
FIG. 15A is a photograph showing a welding portion of Sample 2.
Figure 15B:
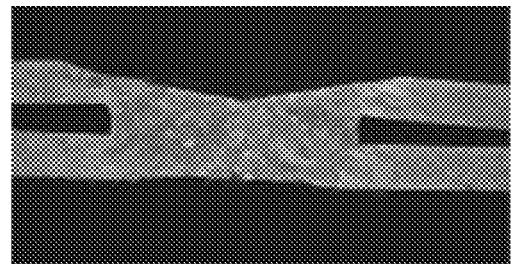
FIG. 15B is a cross section photograph showing a cross section taken along line C1-C1 in FIG. 15A.

First, as shown in FIG. 15B, in the screw portion in the welding portion of Sample 2, molten metal for filling the gap between steel members flowed into the gap, so that a surface of the welding portion in the steel material on the side irradiated with the laser beam was recessed.

Figure 15C:
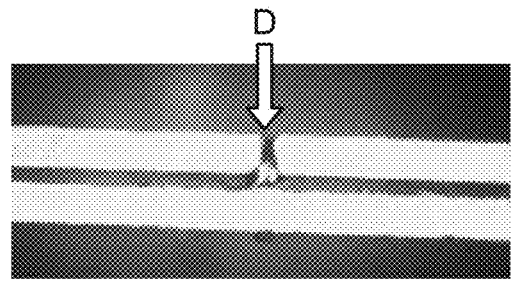
FIG. 15C is a cross section photograph showing a cross section taken along line C2-C2 in FIG. 15A.
Figure 15D:
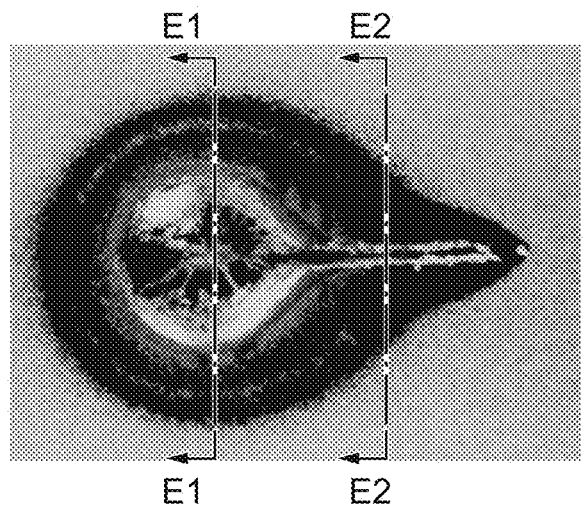
FIG. 15D is a photograph showing a welding portion of Sample 1.

Additionally, as shown in FIG. 15C, burn-through occurred (arrow D) in the linear portion in the welding portion of Sample 2, and no joining was performed.

Figure 15E:
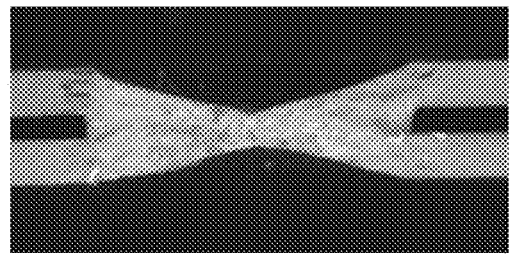
FIG. 15E is a cross section photograph showing a cross section taken along line E1-E1 in FIG. 15D.

Next, as shown in FIG. 15E, in the screw portion 221 in the welding portion 220 of Sample 1, in order to fill the gap between the steel members and in order to fill a part of the gap of the linear portion 222, molten metal flowed into both the gaps, so that the surfaces on both sides of the welding portion 220 were recessed.

Figure 15F:
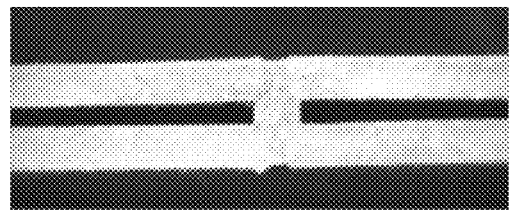
FIG. 15F is a cross section photograph showing a cross section taken along line E2-E2 in FIG. 15D.

As illustrated in FIG. 15F, in Sample 1 in which the linear portion 222 was irradiated with the laser beam before the metal of the screw portion 221 was solidified, the gap was filled with the metal without causing burn-through or the like in the linear portion 222, resulting in showing a good joined cross section.

(2) Welding Method and Internal State of Welding Portion

Figure 14B:
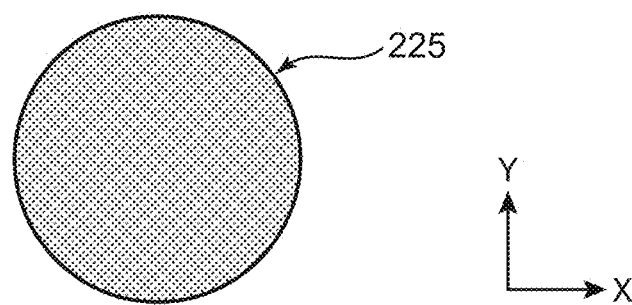
FIG. 14B is a schematic view illustrating a welding mode of Sample 3.
Figure 14C:
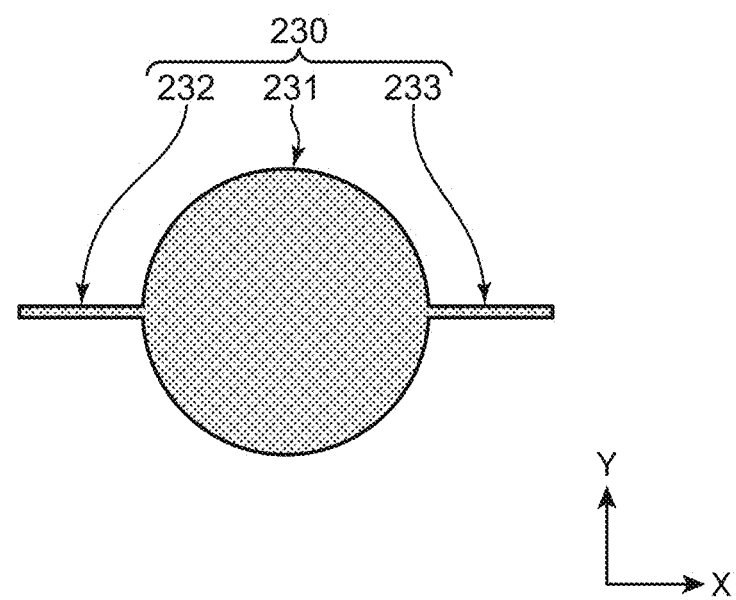
FIG. 14C is a schematic view illustrating a welding mode of Sample 4.

FIG. 14B is a schematic view illustrating a welding mode of Sample 3 and FIG. 14C is a schematic view illustrating a welding mode of Sample 4.

Sample 3

As shown in FIG. 14B, in the formation of Sample 3 as a reference example, materials and the like for use are the same as those of Sample 1. In Sample 3, a welding portion 225 includes only a screw portion. A method for forming the welding portion 225 is the same as a method for forming the screw portion 221 of Sample 1.

Sample 4

As illustrated in FIG. 14C, the welding portion 230 in Sample 4 is obtained by integrally forming a screw portion 231, a linear portion 232 extending on one side in the X direction, and a linear portion 233 extending on the other side in the X direction. Then, in the formation of the welding portion 230, after the screw portion 231 was irradiated with a laser beam, irradiation of the linear portion 232 and the linear portion 233 with the laser beam was started while a molten state of metal of the screw portion 231 was maintained.

Figure 16A:
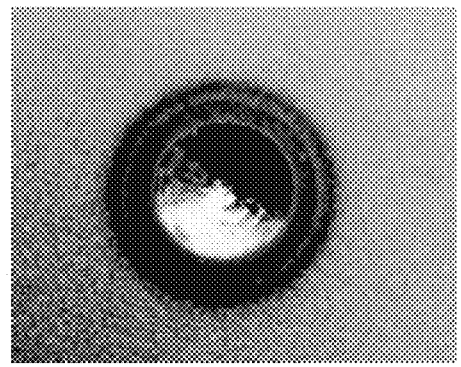
FIG. 16A is a photograph showing a welding portion of Sample 3.
Figure 16B:
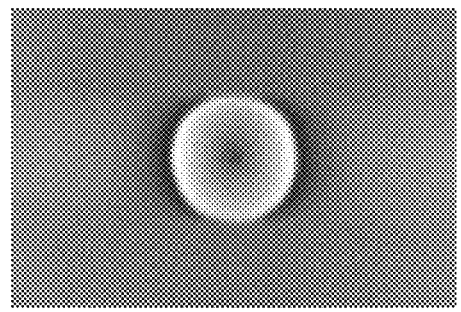
FIG. 16B is a CT photograph showing an internal state of the welding portion of Sample 3.

As shown in FIG. 16A and FIG. 16B, defects were observed neither on a surface or an inside of the welding portion of Sample 3.

Figure 16C:
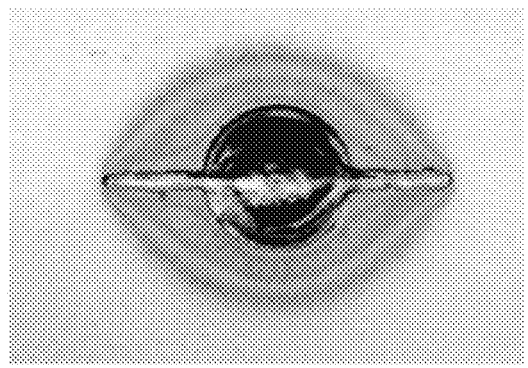
FIG. 16C is a photograph showing a welding portion of Sample 4.
Figure 16D:
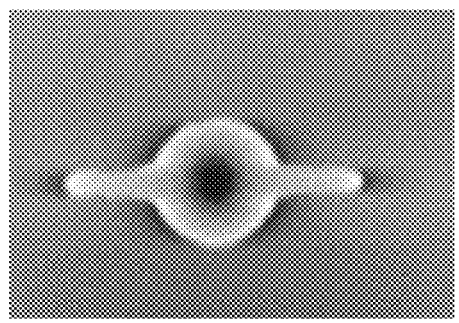
FIG. 16D is a CT photograph showing an internal state of the welding portion of Sample 4.

Additionally, as shown in FIG. 16C and FIG. 16D, defects were observed neither on a surface nor an inside of the welding portion of Sample 4 as well.

(3) Melting and Flow of Metal during Laser Welding

Next, description will be made of verification results of melting and flow of metal when a welding portion including continuously formed screw portion and linear portion is formed by laser welding.

As in the first embodiment, immediately after the screw portion was formed with a diameter of a molten pool being increased while causing a spot of the laser beam to circle around a circling center, no molten metal was solidified. Then, irradiation of a part with a laser beam, the part being where the linear portion was to be formed, was started before the molten metal of the screw portion was solidified. As a result, a part of the molten metal of the screw portion flowed into the gap between metal members in the linear portion and filled the gap.

As the scanning of the laser beam proceeded further, the molten metal gradually started to solidify from a scanning start position of the linear portion (boundary part with the screw portion). Therefore, from this time point, the flowing of the molten metal of the screw portion into the linear portion was stopped.

The molten metal of the screw portion started to solidify from an outer edge part thereof and solidify at a center part thereof last. The molten metal of the linear portion started to solidify earlier than the screw portion. This is considered to be because heat is easily absorbed by a metal member as a base member in the laser welding of the linear portion.

2. Welding Method and Strength Characteristics of Welding Portion

First, samples used for the strength characteristics investigation will be described with reference to FIG. 17A to FIG. 17B.

Sample 11

In the preparation of Sample 11, the same steel member as that of Sample 1 was used. However, laser welding was performed with a gap between the steel members eliminated (0 mm).

Figure 17A:
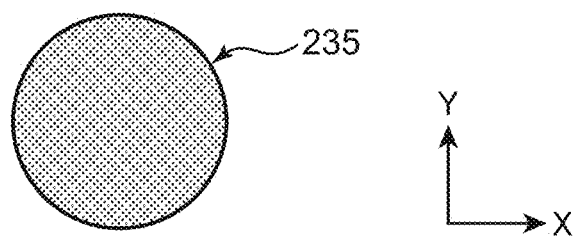
FIG. 17A is a schematic view illustrating a welding mode of Sample 11.

As illustrated in FIG. 17A, Sample 11 is a sample as a reference example, in which a welding portion 235 includes only a screw portion and has a target spot diameter of 5 mm.

Sample 12

Sample 12 is also a sample prepared as a reference example, in which a welding portion includes only a screw portion. Steel members, welding equipment, and welding conditions for use are the same as those of Sample 11 described above. However, at the preparation of Sample 12, a gap between the steel members was set to 0.5 mm.

Sample 13

Figure 17B:
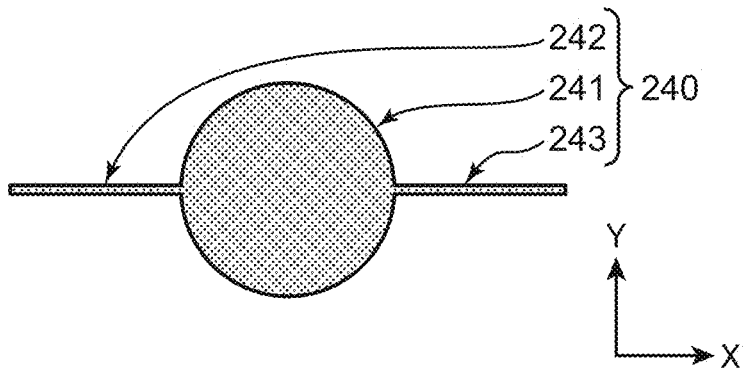
FIG. 17B is a schematic view illustrating a welding mode of Sample 13.

As illustrated in FIG. 17B, a welding portion 240 in Sample 13 is obtained by integrally forming a screw portion 241, a linear portion 242 extending on one side in the X direction, and a linear portion 243 extending on the other side in the X direction. The X direction in each of FIG. 17A to FIG. 17D is a width direction of the steel member. In addition, in the preparation of the present Sample, laser welding was performed with a gap between the steel members eliminated (0 mm).

The screw portion 241 has a target spot diameter of 5 mm and the linear portions 242 and 243 each have a length of 4 mm.

Here, also in the preparation of the present Sample, after the irradiation of the screw portion 241 with the laser beam was performed, the irradiation of the linear portion 242 and the linear portion 243 with the laser beam was started while a molten state of metal of the screw portion 241 was maintained.

Sample 14

Sample 14 is also a sample obtained by forming a welding portion having the same form as that of Sample 13, and uses the same steel members, welding equipment, and welding conditions as those of Sample 13. However, at the preparation of Sample 14, a gap between the steel members was set to 0.5 mm.

Sample 15

Sample 15 is a sample in which a welding portion including a screw portion and two linear portions is formed similarly to Sample 13, and uses the same steel members, welding equipment, and welding conditions as those of Sample 13. However, the present Sample is different from Sample 13 illustrated in FIG. 17B in that a direction in which the linear portion extends is a longitudinal direction (Y direction) of the steel member.

Also in the preparation of the present Sample, laser welding was performed with a gap between the steel members eliminated (0 mm).

Sample 16

Sample 16 is also a sample obtained by forming a welding portion having the same form as that of Sample 15, and uses the same steel members, welding equipment, and welding conditions as those of Sample 14. However, at the preparation of Sample 16, a gap between the steel members was set to 0.5 mm.

Sample 17

Figure 17C:
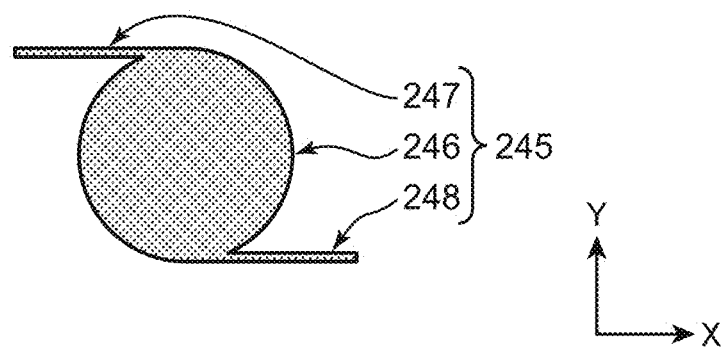
FIG. 17C is a schematic view illustrating a welding mode of Sample 17.

As illustrated in FIG. 17C, a welding portion 245 in Sample 17 is obtained by integrally forming a screw portion 246, a linear portion 247 extending from an outer edge part of the screw portion to one side in the X direction, and a linear portion 248 extending to the other side in the X direction. Also in the present Sample, the linear portions 247 and 248 extend in the X direction which is a width direction of a steel member. In addition, in the preparation of the present Sample, laser welding was performed with a gap between the steel members eliminated (0 mm).

The screw portion 246 has a target spot diameter of 5 mm, and the linear portions 247 and 248 each have a length of 4 mm.

Also in the preparation of the present Sample, after the screw portion 246 was irradiated with the laser beam, irradiation of the linear portion 247 and the linear portion 248 with the laser beam was started while a molten state of metal of the screw portion 246 was maintained.

Sample 18

Sample 18 is also a sample obtained by forming a welding portion having the same form as that of Sample 17, and uses the same steel members and the like as those of Sample 17. However, at the preparation of Sample 18, a gap between the steel members was set to 0.5 mm.

Sample 19

Sample 19 is a sample in which a welding portion including a screw portion and two linear portions is formed similarly to Sample 17, and uses the same steel members and the like as those of Sample 17. However, the present Sample is different from Sample 17 illustrated in FIG. 17C in that a direction in which the linear portion extends is a longitudinal direction (Y direction) of the steel member.

Also in the preparation of the present Sample, laser welding was performed with a gap between the steel members eliminated (0 mm).

Sample 20

Sample 20 is also a sample obtained by forming a welding portion having the same form as that of Sample 19, and uses the same steel members and the like as those of Sample 19. However, at the preparation of Sample 20, a gap between the steel members was set to 0.5 mm.

Sample 21

Figure 17D:
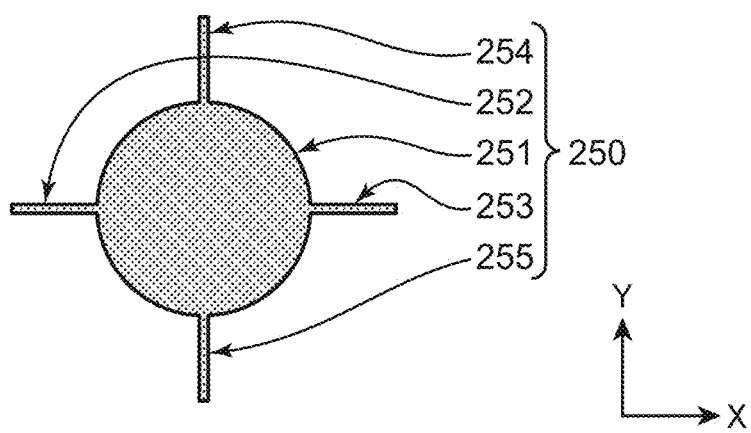
FIG. 17D is a schematic view illustrating a welding mode of Sample 21.

As illustrated in FIG. 17D, a welding portion 250 in Sample 21 is obtained by integrally forming a screw portion 251, a linear portion 252 extending on one side in the X direction, a linear portion 253 extending on the other side in the X direction, a linear portion 254 extending on one side in the Y direction, and a linear portion 255 extending on the other side in the Y direction. In the preparation of the present Sample, laser welding was performed with a gap between steel materials eliminated (0 mm).

The screw portion 251 has a target spot diameter of 5 mm and each of the linear portions 252 to 255 has a length of 2 mm.

Here, also in the preparation of the present Sample, after the screw portion 251 was irradiated with the laser beam, irradiation of the linear portions 252 to 255 with the laser beam was started while a molten state of metal of the screw portion 251 was maintained.

Sample 22

Sample 22 is also a sample obtained by forming a welding portion having the same form as that of Sample 21, and uses the same steel members, welding equipment, and welding conditions as those of Sample 21. However, at the preparation of Sample 22, a gap between the steel members was set to 0.5 mm.

Next, a method of strength tests of Sample 11 to Sample 22 will be described with reference to FIG. 18A and FIG. 18B.

(1) Shearing Tensile Test

Figure 18A:
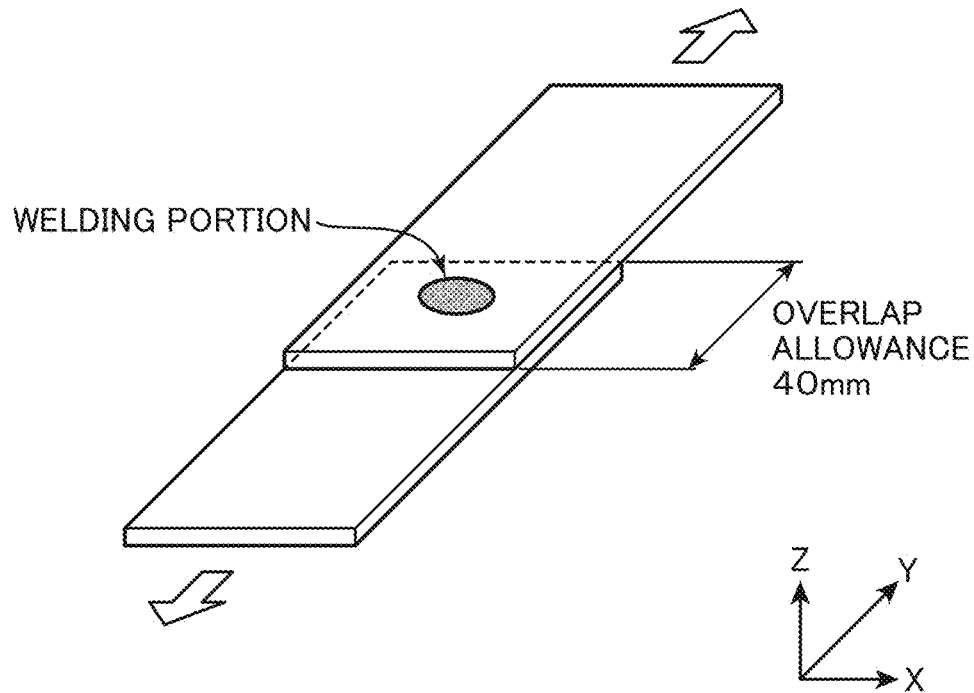
FIG. 18A is a schematic view illustrating a method for a shearing tensile test.

As shown in FIG. 18A, two steel members were disposed with their longitudinal directions aligned in the Y direction and overlapped with each other with a overlap allowance of 40 mm. Then, a welding portion was formed in the overlap portion in each manner of Sample 11 to Sample 22 described above. In the shearing tensile test, tensile strength was measured by applying a tensile force in a manner as indicated by an arrow.

As shown in FIG. 19, when Sample 11, Sample 13, Sample 15, Sample 17, Sample 19, and Sample 21 subjected to laser welding with the gap between the steel members eliminated were compared, it has been found that Sample 15 had a tensile strength about 20% higher than that of Sample 11, and Sample 21 had a tensile strength about 10% higher than that of Sample 11. The Sample 13, Sample 17, and Sample 19 had substantially the same tensile strength as that of Sample 11.

On the other hand, when Sample 12, Sample 14, Sample 16, Sample 18, Sample 20, and Sample 22 subjected to laser welding with the gap between the steel members set to 0.5 mm were compared, Sample 14 had a tensile strength about 30% higher than that of Sample 12, and Sample 16, Sample 18, Sample 20, and Sample 22 had a tensile strength about 10% to 20% higher than that of Sample 12.

(2) Cross Peeling Test

Figure 18B:
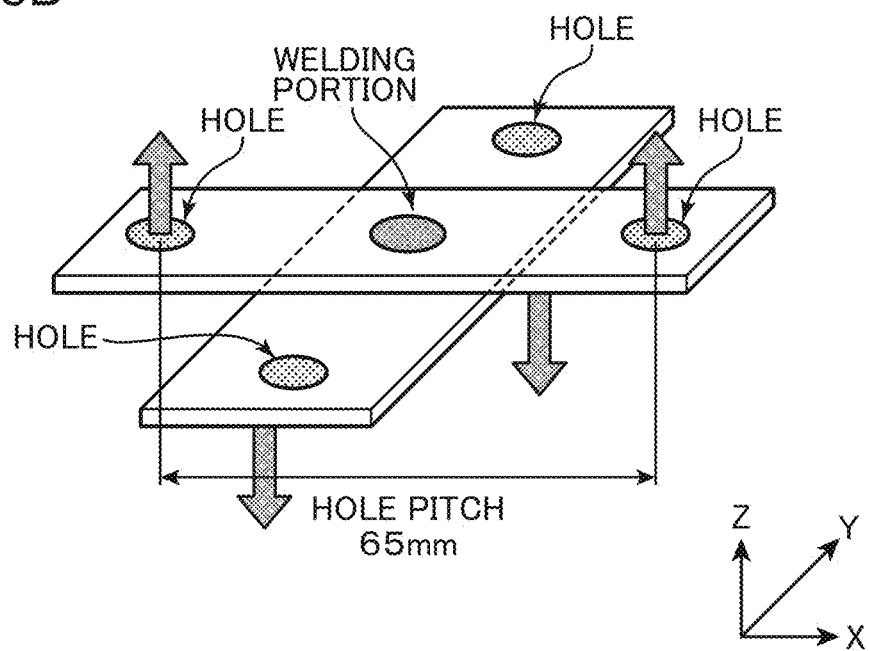
FIG. 18B is a schematic view illustrating a method for a cross peeling test.

As illustrated in FIG. 18B, two steel materials were overlapped in a state of intersecting with each other. Then, a welding portion was formed in a part where the steel members were overlapped with each other in each manner of Sample 11 to Sample 14, Sample 17, Sample 18, Sample 21, and Sample 22. In the cross peeling test, peeling strength was measured by peeling the steel members from each other using a hole provided at an end portion in the longitudinal direction of each steel material.

Figure 20:
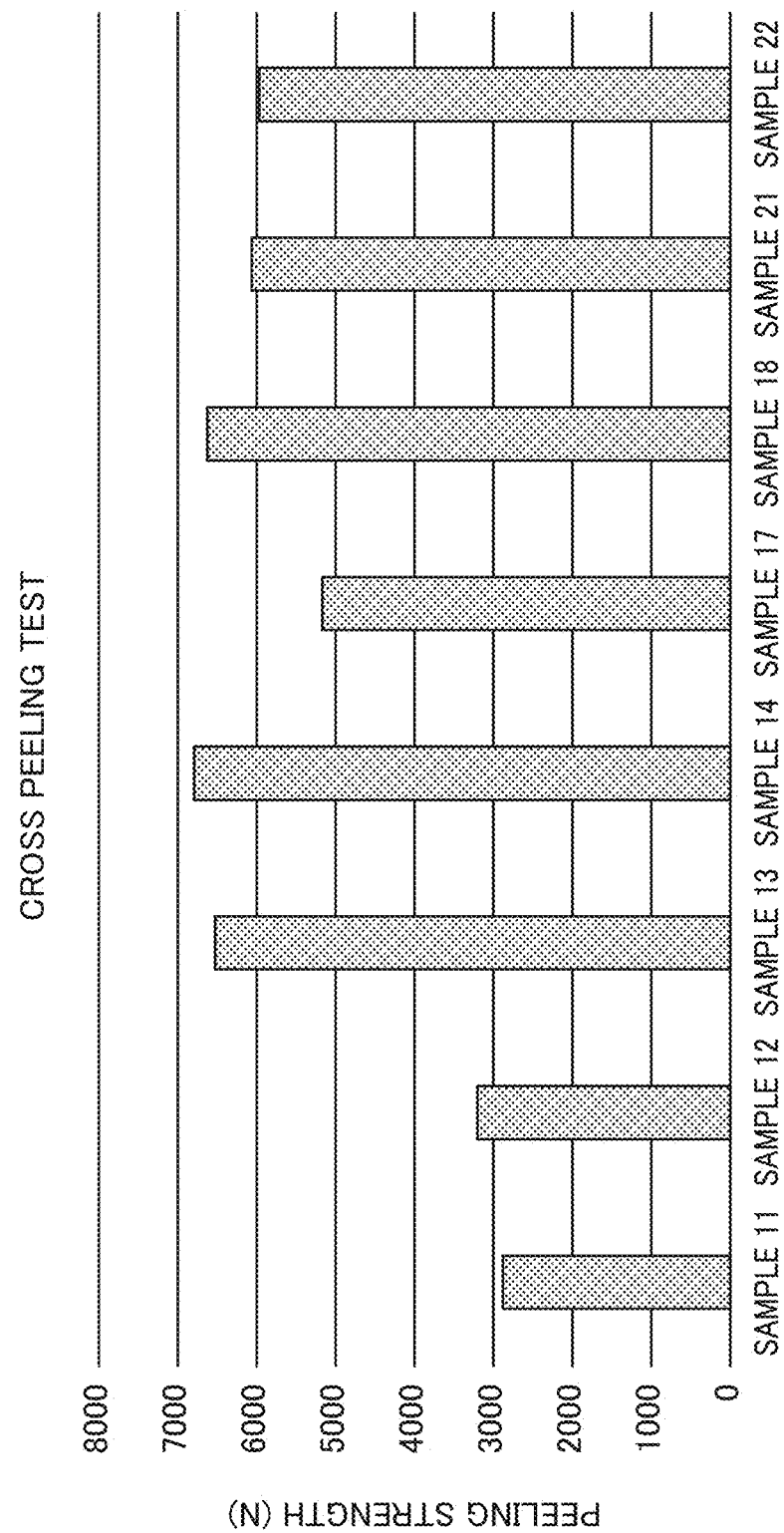
FIG. 20 is a graph showing results of the cross peeling test.

As shown in FIG. 20, Sample 13, Sample 14, Sample 17, Sample 18, Sample 21, and Sample 22 had peeling strengths about 1.8 times to twice higher than those of Sample 11 and Sample 12, the peeling strengths being measured in the cross peeling test. As shown in FIG. 20, the peeling strength measured in the cross peeling test was not largely different between the case where the gap between the steel materials was 0 mm and the case where the gap was 0.5 mm.

(3) Consideration

From the results of the cross peeling test, in particular, among the above two tests, it has been found that in the laser welding method for forming a welding portion prepared by forming a screw portion and a linear portion so as to be continuous, higher peeling strength is realized as compared with Sample 11 and Sample 12 each having the welding portion including only the screw portion. Here, in a case of a welding portion including only a screw portion, since stress acts on a boundary part between incited brittle metal and a heat-affected part to lead to breakage, it is considered that Sample 11 and Sample 12 have low peeling strength. By contrast, in Sample 13, Sample 14, Sample 17, Sample 18, Sample 21, and Sample 22 each having the welding portion prepared by forming the screw portion and the linear portion so as to be continuous, it is considered that the strengths were improved by displacement of a breakage position from the boundary part to the base member.

Modified Example

Although in the first to twenty-first embodiments, the light condensing unit 12 is controlled to scan the spot of the laser beam, the present invention is not limited thereto. For example, the spot of the laser beam may be scanned by driving and controlling the front end portion of the welding robot 13, or the spot of the laser beam may be scanned using an X-Y table or the like. In addition, although in the first to twentieth embodiments, the spot of the laser beam is moved by controlling the light condensing unit 12, the present invention is not limited thereto. For example, a spot of a laser beam may be scanned by moving a metal member to be supplied for welding.

Although in the first to twenty-first embodiments, the welding robot is used, the present invention is not limited thereto. As long as within a certain range, welding to a desired position can be performed just by scanning by the light condensing unit 12.

Although in the first to twenty-first embodiments, two metal members are joined to each other, the present invention is not limited thereto. For example, the same effects as described above can be obtained by applying the present invention also to joining of three or more metal members.

In the present invention, the first to twenty-first embodiments can be applied also in combination with each other.

Furthermore, at the time of oscillating a laser beam, ultrasonic vibration can be applied to the metal member to be supplied for welding. By performing ultrasonic vibration at the time of oscillation of the laser beam, weldability of the metal member is improved to make a structure of the metal fine in the process of solidification thereof, resulting in enabling an increase in material strength.

CONCLUSION

A laser welding device according to one aspect of the present invention is a laser welding device that joins a plurality of metal members by laser welding, the laser welding device including: a laser oscillator that oscillates a laser beam; a light condensing unit that condenses the laser beam on a welding position; a scanning unit that scans a spot of the laser beam; and a control unit that controls the laser oscillator and the scanning unit, in which while causing the laser oscillator to oscillate the laser beam, the control unit forms a screw portion which has a dot shape in a plan view and in which a metal member is melted by scanning of the spot of the laser beam so as to circle around a predetermined position, and while the metal member in the screw portion is in a molten state, the control unit forms a linear portion which is linear in a plan view and continuous with the screw portion and in which a metal member is melted by scanning of the spot of the laser beam so as to be separated from the screw portion.

First, as compared with a case of using resistance welding or the like, because the plurality of metal members are joined by laser welding, the laser welding device according to the above aspect has a higher welding speed and is less affected by heat, and enables the plate materials to be welded in a non-contact manner, resulting in having high processing efficiency and enabling rigidity to be increased by continuous welding.

Next, in the laser welding device according to the above aspect, in the formation of the screw portion, a metal member of a relevant part is melted and stirred by causing the spot of the laser beam to circle, thereby melting metal of a part where the linear portion is to be formed in a state where the metal member of a part where the screw portion is to be formed is molten. Therefore, even if a gap is formed between the metal members in a state before welding, a part of the molten metal of the part where the screw portion is to be formed will flow into the gap between the metal members in the part where the linear portion is to be formed. Therefore, in the laser welding device according to the above aspect, even in a case where a gap is present between the metal members in a state before welding, the gap between the metal members in the linear portion is filled with not only the molten metal in the part where the linear portion is to be formed but also the molten metal flowing from the screw portion, so that occurrence of gouging and burn-through can be suppressed.

Therefore, in the laser welding device according to the above aspect, even when a gap is formed between the metal members, the members can be joined to each other with high joining strength.

The laser welding device according to the above aspect may adopt a configuration in which the linear portion is formed while filling a gap between the plurality of metal members in the linear portion with a part of the molten metal of the screw portion.

In a case of adopting the above configuration, a part of the molten metal of the screw portion can be attracted to the gap between the metal members in the linear portion to fill the gap in the linear portion. Therefore, even in a case where a gap is present between the metal members, high joining strength can be ensured.

The laser welding device according to the above aspect may adopt a configuration in which the control unit causes the spot of the laser beam to circle in a substantially circular manner in a plan view at the melting of the metal member of the screw portion. Note that the term "in a plan view" as used above means viewing from the irradiation direction of the laser beam. The same applies hereinafter.

In a case of adopting the above configuration, at the melting of the metal member in a part where the screw portion is to be formed, by causing the spot of the laser beam to circle in a substantially circular manner in a plan view, molten metal can be stirred well (while suppressing stagnation) in the part where the screw portion is to be formed. This makes it possible to promote favorable inflow of molten metal into the gap between the metal members in a part where the linear portion is to be formed.

The laser welding device according to the above aspect may adopt a configuration in which when the predetermined position is defined as a first predetermined position, the screw portion is defined as a first screw portion, and a position separated from the first predetermined position by a predetermined distance is defined as a second predetermined position, the control unit, while causing the laser oscillator to oscillate the laser beam, forms the first screw portion and a first linear portion continuous with the first screw portion and then forms a second screw portion by scanning of the spot of the laser beam so as to circle around the second predetermined position, thereby melting a metal member and the control unit, while the metal member in the second screw portion is in a molten state, forms a second linear portion which is linear in a plan view and continuous with the second screw portion by scanning of the spot of the laser beam so as to be separated from the second screw portion, and the first linear portion and the second linear portion are connected with each other.

In a case of adopting the above configuration, molten metal stirred in the first screw portion can be poured into a gap between metal members in the first linear portion, and molten metal stirred in the second screw portion can be poured into a gap between metal members in the second linear portion. Therefore, even in a case where a distance between the first screw portion and the second screw portion is long, a sufficient amount of molten metal can be filled in the gap between the metal members between the first screw portion and the second screw portion, so that high joining strength can be ensured.

The laser welding device according to the above aspect may adopt a configuration in which the control unit causes the spot of the laser beam to be scanned in a spiral or zigzag manner in the linear portion at the time of forming the linear portion.

In a case of adopting the above configuration, by scanning the spot of the laser beam, in a spiral manner in a plan view or a zigzag manner in a plan view, at a part where the linear portion is to be formed, it is possible to make long a locus of the spot of the laser beam in the linear portion, to form a wide linear portion, and to form a long linear portion.

The laser welding device according to the above aspect may adopt a configuration in which each of the plurality of metal members is a plate-like member and has a shape extending in a direction separated from a position where the plurality of metal members are overlapped with each other, and the control unit causes the spot of the laser beam to be scanned with respect to the overlapped position such that at least a part of the linear portion is located at a starting point position of the separation of the plurality of metal members.

In a case of adopting such a configuration as described above, since laser welding can be performed such that at least a part of the linear portion is located at the starting point position of separation of the plurality of metal members, a part of molten metal stirred in the screw portion can be filled in a gap between the metal members at the starting point position. Therefore, high joining strength can be ensured, and deformation and the like hardly occur even when a load is applied to the separated part between the plurality of metal members, so that high rigidity can be ensured.

A laser welding method according to one aspect of the present invention is a laser welding method for joining a plurality of metal members by laser welding, the laser welding method including: a laser beam irradiation step of oscillating a laser beam and condensing the oscillated laser beam on a welding position; and a scanning step of scanning a spot of the laser beam, in which in a state where the laser beam is oscillated, a screw portion having a dot shape in a plan view is formed in which a metal member is melted by scanning of the spot of the laser beam so as to circle around a predetermined position, and a linear portion being linear in a plan view and continuous with the screw portion is formed in which a metal member is melted by scanning of the spot of the laser beam so as to be separated from the screw portion while the metal member in the screw portion is in a molten state.

First, as compared with a case of using resistance welding or the like, because the plurality of metal members are joined by laser welding by performing the laser beam irradiation step, the laser welding method according to the above aspect has a higher welding speed and is less affected by heat, and enables the plate materials to be welded in a non-contact manner, resulting in having high processing efficiency and enabling rigidity to be increased by continuous welding.

Next, in the laser welding method according to the above aspect, in the formation of the screw portion, metal of a relevant part is melted and stirred by causing the spot of the laser beam to circle, thereby melting metal of a part where the linear portion is to be formed in a state where the metal of the screw portion is molten. Therefore, even if a gap is present between the metal members in a state before welding, a part of the molten metal of a part where the screw portion is to be formed will flow into the gap between the metal members in the part where the linear portion is to be formed. Therefore, in the laser welding method according to the above aspect, even in a case where a gap is formed between the metal members in a state before welding, the gap between the metal members in the linear portion is filled with not only the molten metal in the linear portion but also molten metal added with the molten metal flowing from the screw portion, so that occurrence of gouging and burn-through can be suppressed.

Therefore, in the laser welding method according to the above aspect, even when a gap is present between the metal members, the members can be joined to each other with high joining strength.

The laser welding method according to the above aspect may adopt a configuration in which the linear portion is formed while filling a gap between the plurality of metal members in the linear portion with a part of the molten metal of the screw portion.

In a case of adopting the above configuration, a part of the molten metal of the screw portion can be attracted to the gap between the metal members in the linear portion to fill the gap in the linear portion. Therefore, even in a case where a gap is present between the metal members, high joining strength can be ensured.

The laser welding method according to the above aspect may adopt a configuration in which in the scanning step, at the melting of the metal member of the screw portion, the spot of the laser beam is caused to circle in a substantially circular manner in a plan view.

In a case of adopting the above configuration, in the scanning step, at the melting of the metal member of the screw portion, by causing the spot of the laser beam to circle in a substantially circular manner in a plan view, the molten metal can be stirred well (while suppressing stagnation) in the screw portion. This makes it possible to promote favorable inflow of molten metal into the gap between the metal members in the linear portion.

The laser welding method according to the above aspect may adopt a configuration in which when the predetermined position is defined as a first predetermined position, the screw portion is defined as a first screw portion, and a position separated from the first predetermined position by a predetermined distance is defined as a second predetermined position, in the scanning step, while causing the laser oscillator to oscillate the laser beam, the first screw portion and a first linear portion continuous with the first screw portion are formed and then a second screw portion is formed by scanning of the spot of the laser beam so as to circle around the second predetermined position, thereby melting a metal member, and while the metal member in the second screw portion is in a molten state, a second linear portion which is linear in a plan view and continuous with the second screw portion is formed by scanning of the spot of the laser beam so as to be separated from the second screw portion, and the first linear portion and the second linear portion are connected with each other.

In a case of adopting the above configuration, molten metal stirred in the first screw portion can be poured into a gap between metal members in the first linear portion, and molten metal stirred in the second screw portion can be poured into a gap between metal members in the second linear portion. Therefore, even in a case where a distance between the first screw portion and the second screw portion is long, a sufficient amount of molten metal can be filled in the gap between the metal members between the first screw portion and the second screw portion, so that high joining strength can be ensured.

The laser welding method according to the above aspect may adopt a configuration in which in the scanning step, the spot of the laser beam is scanned in a spiral or zigzag manner in the linear portion at the time of forming the linear portion.

In a case of adopting the above configuration, by scanning the spot of the laser beam, in a spiral manner in a plan view or a zigzag manner in a plan view, at a part where the linear portion is to be formed, it is possible to make long a locus of the spot of the laser beam in the linear portion, to form a wide linear portion, and to form a long linear portion.

The laser welding method according to the above aspect may adopt a configuration in which each of the plurality of metal members is a plate-like member and has a shape extending in a direction separated from a position where the plurality of metal members are overlapped with each other, and in the scanning step, the spot of the laser beam is scanned with respect to the overlapped position such that at least a part of the linear portion is located at a starting point position of the separation of the plurality of metal members.

In a case of adopting the above configuration, since laser welding can be performed such that at least a part of the linear portion is located at the starting point position of separation of the plurality of metal members, a part of molten metal stirred in the screw portion can be filled in a gap between the metal members at the starting point position. Therefore, high joining strength can be ensured, and deformation and the like hardly occur even when a load is applied to the separated part between the plurality of metal members, so that high rigidity can be ensured.

As described above, in each of the above aspects, even when a gap is present between the metal members, the members can be joined to each other with high joining strength.

The invention claimed is:

1. A laser welding device that joins a plurality of metal members by laser welding, the laser welding device comprising: a laser oscillator that oscillates a laser beam; scanner that scans a spot of the laser beam while condensing the laser beam on a welding position; and a control unit that controls the laser oscillator and the scanner, wherein while causing the laser oscillator to oscillate the laser beam, the control unit forms a plurality of welding portions, each by forming a screw portion which has a dot shape in a plan view and in which a metal member is melted by scanning of the spot of the laser beam so as to circle around a predetermined position, and while the metal member in the screw portion is in a molten state forming a linear portion which is linear in a plan view, continuous with the screw portion, and does not have a turning point and in which a metal member is melted by straight scanning of the spot of the laser beam so as to be separated from the screw portion, and the plurality of welding portions are aligned along a first direction, and the linear portion of each of the plurality of welding portions extends along a second direction perpendicular to the first direction, wherein each of the plurality of metal members is a plate-like member, and has a shape extending in a direction separated from a position where the plurality of metal members are overlapped with each other, and the control unit causes the spot of the laser beam to be scanned with respect to the overlapped position such that at least a part of the linear portion is located at a starting point position of the separation of the plurality of metal members.

2. The laser welding device according to claim 1, wherein the control unit causes the spot of the laser beam to circle in a substantially circular manner in a plan view at the melting of the metal member of the screw portion.

3. A laser welding method for joining a plurality of metal members by laser welding, the laser welding method comprising: a laser beam irradiation step of oscillating a laser beam and condensing the oscillated laser beam on a welding position; and a scanning step of scanning a spot of the laser beam, wherein in a state where the laser beam is oscillated, a plurality of welding portions is formed, each by forming a screw portion having a dot shape in a plan view in which a metal member is melted by scanning of the spot of the laser beam so as to circle around a predetermined position, and forming a linear portion being linear in a plan view, continuous with the screw portion, and not having a turning point in which a metal member is melted by straight scanning of the spot of the laser beam so as to be separated from the screw portion while the metal member in the screw portion is in a molten state, wherein the plurality of welding portions are aligned along a first direction, and the linear portion of each of the plurality of welding portions extends along a second direction perpendicular to the first direction, wherein each of the plurality of metal members is a plate-like member, and has a shape extending in a direction separated from a position where the plurality of metal members are overlapped with each other, and in the scanning step, the spot of the laser beam is scanned with respect to the overlapped position such that at least a part of the linear portion is located at a starting point position of the separation of the plurality of metal members.

4. The laser welding method according to claim 3, wherein in the scanning step, at the melting of the metal member of the screw portion, the spot of the laser beam is caused to circle in a substantially circular manner in a plan view.

* * * * *